(12) United States Patent
Kudo et al.

(10) Patent No.: US 7,309,370 B2
(45) Date of Patent: Dec. 18, 2007

(54) HONEYCOMB FILTER FOR EXHAUST GAS DECONTAMINATION

(75) Inventors: Atsushi Kudo, Gifu (JP); Masafumi Kunieda, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 307 days.

(21) Appl. No.: 10/502,054

(22) PCT Filed: Feb. 5, 2003

(86) PCT No.: PCT/JP03/01152

§ 371 (c)(1),
(2), (4) Date: Nov. 12, 2004

(87) PCT Pub. No.: WO03/067042

PCT Pub. Date: Aug. 14, 2003

(65) Prior Publication Data

US 2005/0076626 A1    Apr. 14, 2005

(30) Foreign Application Priority Data

Feb. 5, 2002   (JP) .............................. 2002-028644

(51) Int. Cl.
*B01D 46/00* (2006.01)
*F01N 3/022* (2006.01)

(52) U.S. Cl. ...................... 55/523; 55/282.2; 55/282.3; 55/385.3; 55/484; 55/524; 55/DIG. 10; 55/DIG. 30; 60/311

(58) Field of Classification Search ............... 55/282.2, 55/282.3, 385.3, 523, 524, DIG. 10, DIG. 30, 55/482, 484; 60/297, 300, 303, 299, 311; 428/116, 117, 118
See application file for complete search history.

(56) References Cited

U.S. PATENT DOCUMENTS 4,451,517 A   5/1984  Inoguchi et al.
4,598,054 A   7/1986  Mochida et al.

(Continued)

FOREIGN PATENT DOCUMENTS

EP    0 361 883 A1    4/1990

(Continued)

OTHER PUBLICATIONS

U.S. Appl. No. 09/926,795.

(Continued)

*Primary Examiner*—Jason M. Greene
(74) *Attorney, Agent, or Firm*—Oblon, Spivak, McClelland, Maier & Neustadt, P.C.

(57) ABSTRACT

A honeycomb filter for purifying exhaust gases, which makes it possible to alleviate a thermal stress generated due to occurrence of a local temperature change, is less likely to generate cracks, and is excellent in strength and durability. The honeycomb filter has a structure in which a plurality of column-shaped porous ceramic members, each having a number of through holes that are placed side by side in the length direction with a partition wall interposed therebetween, are combined with one another through adhesive layers so that the partition wall that separates the through holes are allowed to function as a filter for collecting particulates. A thermal expansion coefficient $\alpha_L$ of the adhesive layer and a thermal expansion coefficient $\alpha_F$ of the porous ceramic member is as follows:

$$0.01 < |\alpha_L - \alpha_F|/\alpha_F < 1.0.$$

14 Claims, 4 Drawing Sheets

U.S. PATENT DOCUMENTS

| | | | |
|---|---|---|---|
| 5,108,685 A | 4/1992 | Kragle | |
| 5,445,786 A | 8/1995 | Harada et al. | |
| 5,567,663 A | 10/1996 | Kotani et al. | |
| 5,914,187 A | 6/1999 | Naruse et al. | |
| 5,930,994 A | 8/1999 | Shimato et al. | |
| 6,276,595 B1 | 8/2001 | Brück | |
| 6,447,564 B1 | 9/2002 | Ohno et al. | |
| 6,565,630 B2 | 5/2003 | Ohno et al. | |
| 6,669,751 B1 * | 12/2003 | Ohno et al. | 55/523 |
| 6,770,116 B2 | 8/2004 | Kojima | |
| 2002/0197193 A1 * | 12/2002 | Harada et al. | 55/523 |
| 2004/0031264 A1 | 2/2004 | Kojima | |
| 2004/0033175 A1 | 2/2004 | Ohno et al. | |
| 2004/0055265 A1 | 3/2004 | Ohno et al. | |
| 2004/0097370 A1 | 5/2004 | Ichikawa et al. | |
| 2004/0161596 A1 | 8/2004 | Taoka et al. | |
| 2004/0223892 A1 | 11/2004 | Kojima | |
| 2005/0076626 A1 | 4/2005 | Kudo et al. | |
| 2005/0159310 A1 | 7/2005 | Ohno et al. | |
| 2005/0176581 A1 | 8/2005 | Ohno et al. | |
| 2005/0214504 A1 | 9/2005 | Yoshida | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2006/0019061 A1 | 1/2006 | Oshimi | |
| 2006/0029897 A1 | 2/2006 | Saijo et al. | |
| 2006/0029898 A1 | 2/2006 | Saijo et al. | |
| 2006/0043652 A1 | 3/2006 | Saijo et al. | |
| 2006/0059877 A1 | 3/2006 | Yoshida | |
| 2006/0172113 A1 | 8/2006 | Kunieda | |
| 2006/0210765 A1 | 9/2006 | Ohno et al. | |
| 2006/0216466 A1 | 9/2006 | Yoshida | |
| 2006/0216467 A1 | 9/2006 | Yoshida | |
| 2006/0222812 A1 | 10/2006 | Koyama | |
| 2006/0225390 A1 | 10/2006 | Yoshida | |
| 2006/0228521 A1 | 10/2006 | Ohno et al. | |
| 2006/0230732 A1 | 10/2006 | Kunieda | |

FOREIGN PATENT DOCUMENTS

| | | |
|---|---|---|
| EP | 0 816 065 A1 * | 1/1998 |
| EP | 965 735 | 12/1999 |
| EP | 1 142 619 A1 | 10/2001 |
| EP | 1 174 399 A1 | 1/2002 |
| EP | 1 249 262 A1 | 10/2002 |
| EP | 1 413 345 A1 | 4/2004 |
| EP | 1 447 535 A1 | 8/2004 |
| EP | 1 452 511 A1 | 9/2004 |
| FR | 2 833 857 | 6/2003 |
| JP | 6-193429 | 7/1994 |
| JP | 8-28246 | 1/1996 |
| JP | 2000-102709 | 4/2000 |
| JP | 2001-98936 * | 4/2001 |
| JP | 2001-190916 * | 7/2001 |
| JP | 2002-273137 | 9/2002 |
| WO | WO 98/56531 | 12/1998 |
| WO | WO 01/51173 A1 | 7/2001 |
| WO | WO 01/93984 A1 | 12/2001 |

OTHER PUBLICATIONS

U.S. Appl. No. 10/129,126.
U.S. Appl. No. 10/490,206, filed Sep. 2, 2004, Hong et al.
U.S. Appl. No. 10/490,205, filed Sep. 9, 2004, Komori et al.
U.S. Appl. No. 10/493,056, filed Aug. 17, 2004, Hong et al.
U.S. Appl. No. 10/502,054, filed Jul. 30, 2004, Kudo et al.
U.S. Appl. No. 10/502,045, filed Jul. 29, 2004, Kudo et al.
U.S. Appl. No. 10/502,054, filed Nov. 12, 2004, Kudo et al.
U.S. Appl. No. 10/506,438, filed Sep. 2, 2004, Taoka et al.
U.S. Appl. No. 10/502,044, filed Jul. 29, 2004, Taoka et al.
U.S. Appl. No. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/507,375, filed Sep. 21, 2004, Ohno et al.
U.S. Appl. No. 10/509,688, filed Oct. 12, 2004, Yamada.
U.S. Appl. No. 10/986,227, filed Nov. 12, 2004, Ono et al.
U.S. Appl. No. 10/513,798, filed Nov. 18, 2004, Kunieda et al.
U.S. Appl. No. 10/515,179, filed Nov. 26, 2004, Yamada.
U.S. Appl. No. 10/515,181, filed Nov. 26, 2004, Komori et al.
U.S. Appl. No. 10/514,560, filed Nov. 30, 2004, Ohno et al.
U.S. Appl. No. 10/516,328, filed Dec. 14, 2004, Komori et al.
U.S. Appl. No. 10/518,373, filed Dec. 28, 2004, Ohno et al.
U.S. Appl. No. 11/033,151, filed Jan. 12, 2005, Ohno et al.
U.S. Appl. No. 10/521,592, filed Jan. 18, 2005, Ohno et al.
U.S. Appl. No. 11/225,197.
U.S. Appl. No. 10/518,548, filed Jan. 3, 2005, Takahashi.
U.S. Appl. No. 10/527,531, filed Mar. 11, 2005, Ogyu et al.
U.S. Appl. No. 10/530,561, filed Apr. 7, 2005, Komori et al.
U.S. Appl. No. 11/174,726, filed Jul. 6, 2005, Ohno et al.
U.S. Appl. No. 11/174,483, filed Jul. 6, 2005, Saijo et al.
U.S. Appl. No. 11/476,929.
U.S. Appl. No. 11/496,431.
U.S. Appl. No. 11/513,149.
U.S. Appl. No. 11/518,998.
U.S. Appl. No. 11/600,775.
U.S. Appl. No. 11/600,784.
U.S. Appl. No. 11/626,158, filed Jan. 23, 2007, Ohno et al.

* cited by examiner

A-A Line cross-sectional view

HONEYCOMB FILTER FOR EXHAUST GAS DECONTAMINATION

CROSS REFERENCE TO RELATED APPLICATION

This application claims benefit of priority to Japanese Patent Application No. 2002-28644, filed on Feb. 5, 2002, the contents of which are incorporated by reference herein.

TECHNICAL FIELD

The present invention relates to a honeycomb filter for purifying exhaust gases, that is used as a filter for removing particulates and the like contained in exhaust gases discharged from an internal combustion engine such as a diesel engine.

BACKGROUND ART

In recent years, particulates, contained in exhaust gases discharged from internal combustion engines of vehicles such as buses and trucks and construction machines, have raised serious problems since those particulates are harmful to the environment and the human body.

For this reason, there have been proposed various ceramics filters which allow exhaust gases to pass through porous ceramics to collect particulates in the exhaust gases, so that the exhaust gases can be purified.

Normally, the ceramic filter of this type has a structure in that a number of through holes are arranged side by side in one direction and partition wall that separate the through holes from each other is allowed to function as filters.

In other words, each of the through holes formed in the ceramic filter is sealed with a plug at either of ends of its exhaust-gas inlet side and outlet side, so that exhaust gases that have entered one through hole are discharged from another through hole after having always passed through each part of the partition wall that separates the through holes; thus, when exhaust gases are made to pass through the partition wall, particulates are captured by the partition wall so that the exhaust gases are purified.

As such a purifying process for exhaust gases progresses, particulates are gradually accumulated on the partition wall that separates the through holes of the ceramic filter to cause clogging and the subsequent interruption in gas permeability. For this reason, the above-mentioned ceramic filter needs to be subjected to a recycling process regularly by burning and removing the particulates that cause clogging using heating means such as a heater.

In such a recycling process, however, it is difficult to evenly heat the ceramic filter, thus the heat is locally generated due to the burning of the particulates to cause a large thermal stress. Moreover, even during normal operations, an uneven temperature distribution occurs inside the ceramic filter due to a thermal impact or the like derived from an abrupt temperature change in the exhaust gases, resulting in a thermal stress.

Consequently, in the case where the ceramic filter is constituted by a single ceramic member, cracks tend to be generated to cause a serious problem in collecting the particulates.

Moreover, in an attempt to produce a large-size ceramic filter, since firing shrinkage becomes greater upon firing, it becomes difficult to control the shape.

For this reason, there has been proposed a honeycomb filter having the following structure: a ceramic filter is divided into a plurality of porous ceramic members, with a number of through holes formed therein, and the porous ceramic members are combined with one another through adhesive layers.

With the honeycomb filter of this type, it becomes possible to reduce a thermal stress that is exerted on the honeycomb filter during recycling processes and operations, and also to freely adjust the size thereof by increasing or reducing the number of the porous ceramic members.

Incidentally, in the conventional honeycomb filter having this structure, it has been considered that it is preferable to set the thermal expansion coefficient of the porous ceramic member and the thermal expansion coefficient of the adhesive layer in the same level.

The reason for this is explained as follows: actually, the above-mentioned honeycomb filter is used in a wide temperature range, for example, from 10 to 800° C., and when the thermal expansion coefficient of the porous ceramics member is different from the thermal expansion coefficient of the adhesive layer, cracks tend to be generated in the porous ceramic member and the adhesive layer due to the difference in the coefficients of these members.

However, in the case where the thermal expansion coefficient of the porous ceramic member and the thermal expansion coefficient of the adhesive layer are made completely identical to each other, this case is the same as the case using a single ceramic member. Therefore, when particulates are burned locally in the honeycomb filter, that is, when a local temperature change occurs therein, due to: uneven amounts of accumulated particulates; uneven amounts of catalyst in the case of allowing the honeycomb filter to support the catalyst; and unevenness of applied heat given by a heater, exhaust gases and the like, a great thermal stress is generated between the portion having this local temperature change and the other portions, with the result that cracks tend to be generated in the porous ceramic member and the adhesive layer.

Whereas, related to this problem, JP Kokai 2001-190916 has disclosed a honeycomb filter in which Young's modulus of the adhesive layer is set to 20% or less of Young's modulus of the porous ceramic member and a honeycomb filter in which the material strength of the adhesive layer is made lower than the material strength of the porous ceramic member. Here, in the honeycomb filter in which Young's modulus of the adhesive layer is made lower than Young's modulus of the porous ceramic member, the adhesive layer having a comparatively low Young's modulus tends to be extended more easily than the porous ceramic member upon application of the same force onto the adhesive layer and the porous ceramic member, thereby making it possible to alleviate the thermal stress to be imposed on the porous ceramic member.

However, in the case of the honeycomb filter in which Young's modulus of the adhesive layer is set to 20% or less of Young's modulus of the porous ceramic member and the honeycomb filter in which the material strength of the adhesive layer is made lower than the material strength of the porous ceramic member, the kinds of the materials of the adhesive layer and the porous ceramic member to be used are limited. Moreover, even in the case of the above-mentioned honeycomb filters, when the coefficient of the thermal expansion of the porous ceramic member and the coefficient of the thermal expansion of the adhesive layer are equivalent to each other, in the case of occurrence of a local temperature change, it was not possible to sufficiently alleviate a great thermal stress, resulting in the problem of the generation of cracks in the porous ceramic member and the adhesive layer.

SUMMARY OF THE INVENTION

The present invention has been devised in order to solve the above-mentioned problems, and an object thereof is to provide a honeycomb filter for purifying exhaust gases, which makes it possible to alleviate a thermal stress generated due to occurrence of a local temperature change, which is less likely to generate cracks, and which is excellent in strength and durability.

The present invention is directed to the honeycomb filter for purifying exhaust gases which has a structure in which: a plurality of a columnar porous ceramic member are combined with one another through adhesive layer, each of the above-mentioned columnar porous ceramic member comprising a number of through holes that are placed in parallel with one another in the length direction with partition wall interposed therebetween such that the above-mentioned partition wall which separates the above-mentioned through holes functions as a filter for collecting particulates wherein the relationship between a thermal expansion coefficient $\alpha_L$ of the above-mentioned adhesive layer and a thermal expansion coefficient $\alpha_F$ of the above-mentioned porous ceramic member is as follows: $0.01 < |\alpha_L - \alpha_F|/\alpha_F < 1.0$.

In the honeycomb filter for purifying exhaust gases according to the present invention, preferably, Young's modulus of the adhesive layer is set to 60% or less of Young's modulus of the porous ceramic member, and the relationship between a thermal expansion coefficient $\alpha_L$ of the adhesive layer and a thermal expansion coefficient $\alpha_F$ of the porous ceramic member is as follows:

$$0.01 < (\alpha_L - \alpha_F)/\alpha_F < 1.0.$$

Figure 1:
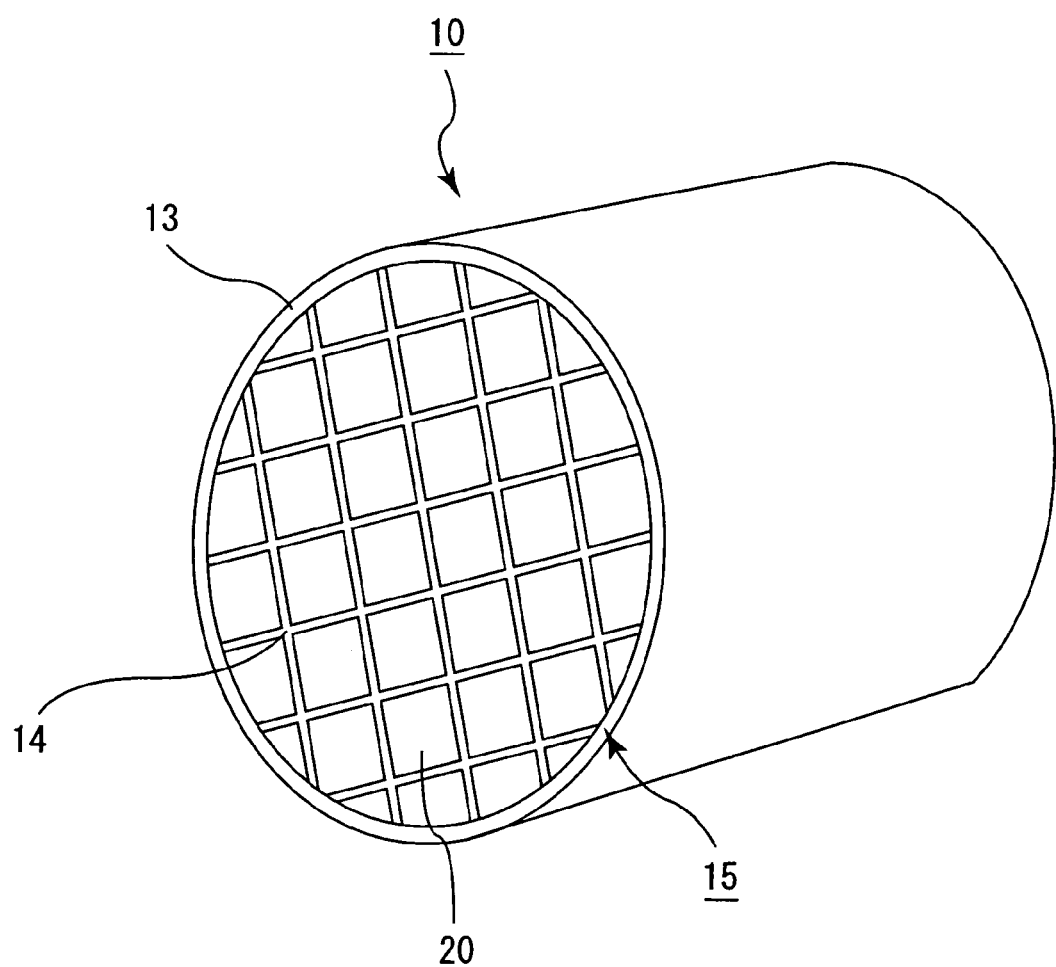
FIG. 1 is a perspective view that schematically shows one example of a honeycomb filter for purifying exhaust gases of the present invention.

EXPLANATION OF SYMBOLS 10 honeycomb filter for purifying exhaust gases
13 sealing material layer
14 adhesive layer
15 ceramic block
20 porous ceramic member
21 through hole
22 plug
23 partition wall

DETAILED DISCLOSURE OF THE INVENTION

The present invention is directed to a honeycomb filter for purifying exhaust gases which has a structure in which: a plurality of a columnar porous ceramic member are combined with one another through adhesive layer, each of the above-mentioned columnar porous ceramic member comprising a number of through holes that are placed in parallel with one another in the length direction with partition wall interposed therebetween such that the above-mentioned partition wall which separates the above-mentioned through holes functions as a filter for collecting particulates wherein the relationship between a thermal expansion coefficient $\alpha_L$ of the above-mentioned adhesive layer and a thermal expansion coefficient $\alpha_F$ of the above-mentioned porous ceramic member is as follows: $0.01 < |\alpha_L - \alpha_F|/\alpha_F < 1.0$.

In the honeycomb filter for purifying exhaust gases of the present invention (hereinafter, simply referred to as the honeycomb filter of the present invention), the relational expression, $|\alpha_L - \alpha_F|/\alpha_F$, between the thermal expansion coefficient $\alpha_L$ of the adhesive layer and the thermal expansion coefficient $\alpha_F$ of the porous ceramic member has a lower limit exceeding 0.01 and an upper limit of less than 1.0. Here, with respect to the value of the above-mentioned relational expression, when several measured points are obtained in a temperature range from 300 to 900° C., it is desirable that each of the values should satisfy the relational expression; however, it may be the case that the average values of these satisfy the above-mentioned relational expression.

When the above-mentioned relational expression, $|\alpha_L - \alpha_F|/\alpha_F$, is 0.01 or less, the thermal expansion coefficient of the adhesive layer and the thermal expansion coefficient of the porous ceramic member become almost the same, thus it is not possible to alleviate a local thermal stress that is exerted when local burning occurs in the honeycomb filter due to unevenness in the accumulated amount of particulates, unevenness in the amount of catalyst in the case of allowing the honeycomb filter to support the catalyst, uneven heating caused by a heater and exhaust gases and the like. Consequently, cracks are generated in the porous ceramic member and the bonding agent layer, with the result that the strength of the honeycomb filter is lowered to cause leak of exhaust gases. When the above-mentioned relational expression, $|\alpha_L - \alpha_F|/\alpha_F$, is 1.0 or more, the difference between the thermal expansion of the adhesive layer and the thermal expansion of the porous ceramic member becomes too large due to a temperature difference among exhaust gases during normal operations of the honeycomb filter, thus cracks are generated in the porous ceramic member and the adhesive layer to cause a decrease in the strength of the honeycomb filter and leak of exhaust gases.

The above-mentioned relational expression, $|\alpha_L - \alpha_F|/\alpha_F$, desirably has a lower limit value exceeding 0.02 and an upper limit value of less than 0.5. This is because, this range makes it possible to positively prevent occurrence of cracks in the porous ceramic member and the adhesive layer.

Although it is not particularly limited, the thermal expansion coefficient $\alpha_F$ of the porous ceramic member, which is appropriately determined depending on the ceramic material and the like to be used, is desirably set in a range from $0.1 \times 10^{-6}$ to $10.0 \times 10^{-16}$ (1/K). In the case where the thermal expansion coefficient $\alpha_F$ of the above-mentioned porous ceramic member is less than $0.1 \times 10^{-6}$ (1/K), the thermal expansion coefficient becomes too small to sometimes result in a difficulty in selecting the ceramic material; in contrast, in the case of the thermal expansion coefficient $\alpha_F$ of the porous ceramic member exceeding $10.0 \times 10^{-6}$ (1/K), since, during normal processes of the honeycomb filter of the present invention, the porous ceramic member expands or shrinks greatly, cracks tend to be generated in the porous ceramic member and the adhesive layer.

Although it is not particularly limited, the thermal expansion coefficient $\alpha_L$ of the porous ceramic member, which is appropriately determined so as to satisfy the above-mentioned inequalities, $0.01 < |\alpha_L - \alpha_F|/\alpha_F < 1.0$, in association with the thermal expansion coefficient $\alpha_F$ of the porous ceramic member, is desirably set in a range from $0.1 \times 10^{-6}$ to $10.0 \times 10^{-6}$ (1/K). In the case where the thermal expansion coefficient $\alpha_L$ of the adhesive layer is less than $0.1 \times 10^{-6}$ (1/K), it sometimes becomes difficult to select the ceramic material. In contrast, in the case of the thermal expansion coefficient $\alpha_L$ of the adhesive layer exceeding $10.0 \times 10^{-6}$ (1/K), since, during normal operations of the honeycomb filter of the present invention, the adhesive layer expands or shrinks greatly, cracks tend to be generated in the porous ceramic member and the adhesive layer.

Here, in the above-mentioned relational expression, the numerator portion indicating the difference, $\alpha_L - \alpha_F$, between the thermal expansion coefficient $\alpha_L$ of the adhesive layer and the thermal expansion coefficient $\alpha_F$ of the porous ceramic member is represented by the absolute value because the thermal expansion coefficient $\alpha_F$ of the porous ceramic member occasionally becomes greater than the thermal expansion coefficient $\alpha_L$ of the adhesive layer, depending on materials of the adhesive layer and the porous ceramic material to be used and temperatures.

In the honeycomb filter of the present invention, Young's modulus of the adhesive layer is desirably set to less than 60% of Young's modulus of the porous ceramic member. Here, Young's modulus serves as a scale on the strength of the material, and is obtained from the initial gradient in the stress-strain curve. Young's modulus of the above-mentioned adhesive layer is set to 60% or less of Young's modulus of the above-mentioned porous ceramic member so that the porous ceramic member is comparatively hard, while the adhesive layer is comparatively soft; thus, the honeycomb filter of the present invention is allowed to maintain necessary strength as a whole and the adhesive layer makes it possible to sufficiently alleviate thermal stress that is generated upon occurrence of a local temperature change. In contrast, in the case of the modulus exceeding 60%, the porous ceramic member becomes too soft or the adhesive layer becomes too hard. When the porous ceramic member is too soft, the strength of the honeycomb filter of the present invention becomes insufficient as a whole, hence, the dimensional stability is lowered, and cracks tend to be generated due to thermal stress, thermal impact and the like. Moreover, when the adhesive layer is too hard, the adhesive layer fails to sufficiently alleviate thermal stress that occurs upon generation of a local temperature change in the honeycomb filter of the present invention, resulting in the occurrence of crack.

Moreover, in the case where Young's modulus of the above-mentioned adhesive layer is 60% or less of that of the above-mentioned porous ceramic member, normally, since the thermal expansion coefficient $\alpha_L$ of the adhesive layer is greater than the thermal expansion coefficient $\alpha_F$ of the porous ceramic member, $(\alpha_L - \alpha_F)$ becomes a positive value. In other words, the honeycomb filter of the present invention satisfies the relationship, $0.01 < (\alpha_L - \alpha_F)/\alpha_F < 1.0$. This is because the adhesive layer is comparatively soft, while the porous ceramic member is comparatively hard. As described above, when the above-mentioned relational expression $(\alpha_L - \alpha_F)/\alpha_F$ is 0.01 or less, the thermal expansion coefficient of the adhesive layer becomes almost the same as the thermal expansion coefficient of the porous ceramic member, thus it is not possible to alleviate a local thermal stress that is exerted when local burning occurs in the honeycomb filter due to: unevenness in the accumulated amount of particulates; unevenness in the amount of catalyst in the case of allowing the honeycomb filter to support the catalyst; uneven heating caused by a heater and exhaust gases and the like. Consequently, cracks are generated in the porous ceramic member and the bonding agent layer, with the result that the strength of the honeycomb filter is lowered to cause leak of exhaust gases. When the above-mentioned relational expression, $(\alpha_L - \alpha_F)/\alpha_F$, is 1.0 or more, the difference between the thermal expansion of the adhesive layer and the thermal expansion of the porous ceramic member becomes too large due to a temperature difference among exhaust gases during normal operations of the honeycomb filter, thus cracks are generated in the porous ceramic member and the adhesive layer to cause a decrease in the strength of the honeycomb filter and leak of exhaust gases.

Next referring to the drawings, the following description will discuss respective members constituting the honeycomb filter of the present invention in detail.

FIG. 1 is a perspective view that schematically shows one example of the honeycomb filter of the present invention, and FIG. 2(a) is a perspective view that schematically shows one example of a porous ceramic member that constitutes the honeycomb filter of the present invention, and FIG. 2(b) is a cross-sectional view taken along line A-A of FIG. 2(a).

Figure 2:
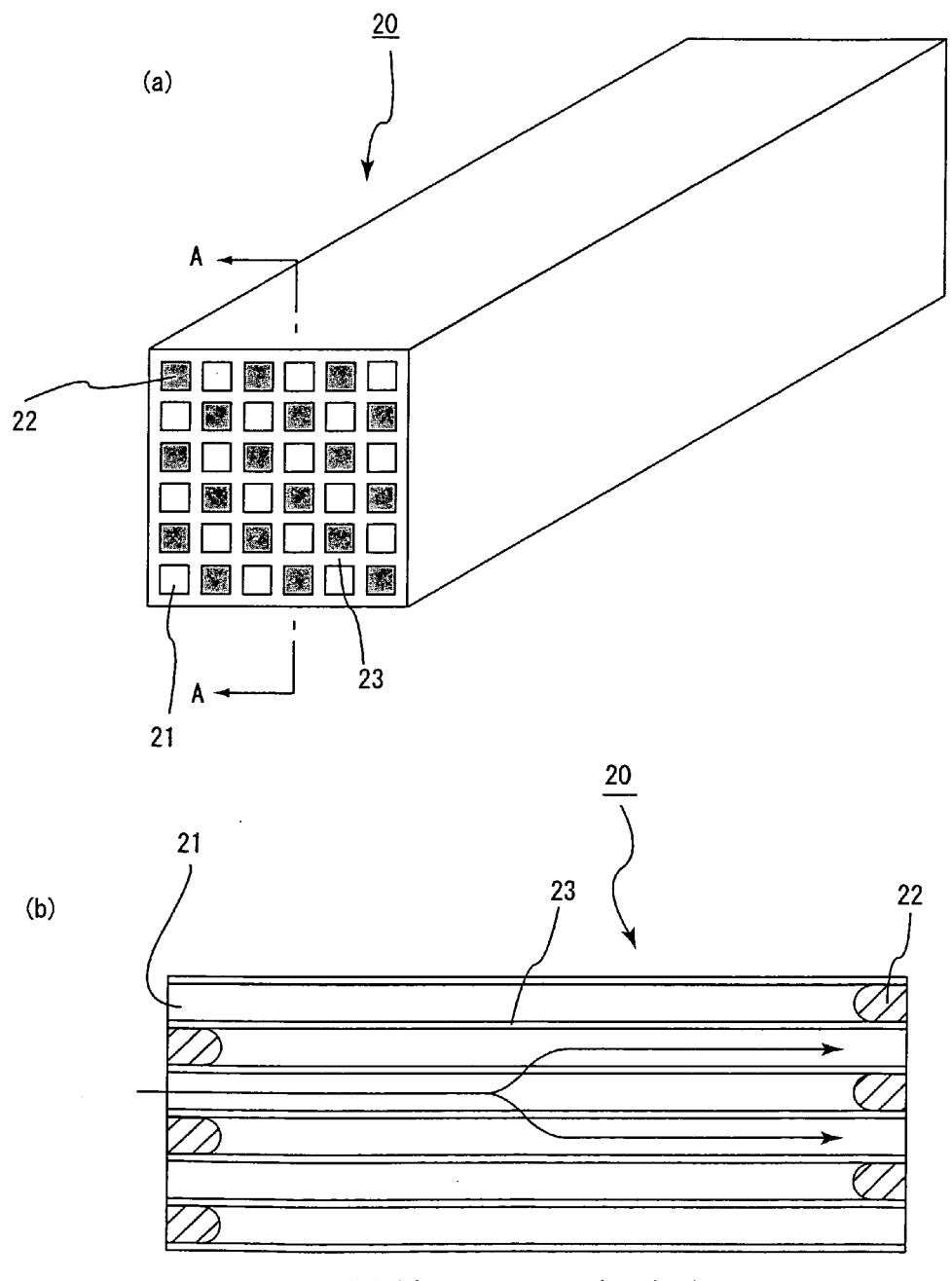
FIG. 2(a) is a perspective view that schematically shows a porous ceramic member used in the honeycomb filter of the present invention shown in FIG. 1.
FIG. 2(b) is a cross-sectional view taken along line A-A of FIG. 2A.

As shown in FIG. 1, in the honeycomb filter 10 of the present invention, a plurality of porous ceramic members 20 are combined with each other through adhesive layers 14 to form a ceramic block 15, and a sealing material layer 13 is formed on the circumference of the ceramic block 15. Here, as shown in FIG. 2, the porous ceramic member 20 has a structure in that a number of through holes 21 are placed side by side in the length direction so that each part of partition wall 23 that separates the through holes 21 from each other is allowed to function as a filter.

In other words, as shown in FIG. 2(b), each of the through holes 21 formed in the porous ceramic member 20 has either of its ends on the inlet-side or outlet-side of exhaust gases sealed with a plug 22; thus, exhaust gases that have entered one of the through holes 21 are allowed to flow out of the other through hole 21 after always passing through the partition wall 23 that separates the corresponding through holes 21.

Moreover, the sealing material layer 13 is placed so as to prevent exhaust gases from leaking through the circumferential portion of each ceramic block 15 when the honeycomb filter 10 is placed in an exhaust passage of an internal combustion engine.

The honeycomb filter 10 having the above-mentioned structure is placed in the exhaust passage in the internal combustion engine so that particulates in the exhaust gases discharged from the internal combustion engine are captured by the partition wall 23 when passing through the honeycomb filter 10; thus, the exhaust gases are purified.

Since the honeycomb filter 10 of this type has superior heat resistance and provides easy recycling processes and the like, it has been applied to various large-size vehicles and vehicles with diesel engines.

With respect to the material for the porous ceramic member 20, not particularly limited, examples thereof include: nitride ceramics such as aluminum nitride, silicon nitride, boron nitride, titanium nitride and the like, carbide ceramics such as silicon carbide, zirconium carbide, titanium carbide, tantalum carbide, tungsten carbide and the like, and oxide ceramics such as alumina, zirconia, cordierite, mullite and the like. In particular, silicon carbide, which has great heat resistance, superior mechanical properties and great thermal conductivity, is desirably used. Here, silicon-containing ceramics in which metallic silicon is blended in the above-mentioned ceramics and ceramics that are combined by silicon and a silicate compound may be used.

Although not particularly limited, the porosity of the porous ceramic member 20 is desirably set to about 40 to 80%. When the porosity is less than 40%, the honeycomb filter 10 of the present invention is likely to generate clogging, while the porosity exceeding 80% causes degradation in the strength of the porous ceramic members 20, resulting in easily breakage.

Here, the above-mentioned porosity can be measured through known methods, such as a mercury press-in method, Archimedes' method and a measuring method using a scanning electronic microscope (SEM).

The average pore diameter of the porous ceramic members 20 is desirably set in a range from 5 to 100 μm. The average pore diameter of less than 5 μm tends to cause clogging of particulates easily. In contrast, the average pore diameter exceeding 100 μm tends to cause particulates to pass through the pores, with the result that the particulates cannot be collected, making the members unable to function as a filter.

With respect to the particle size of ceramic particles to be used upon manufacturing the porous ceramic members 20, although not particularly limited, those which are less susceptible to shrinkage in the succeeding sintering process are desirably used, and for example, those particles, prepared by combining 100 parts by weight of ceramic particles having an average particle size from 0.3 to 50 μm with 5 to 65 parts by weight of ceramic particles having an average particle size from 0.1 to 1.0 μm, are desirably used. This is because, by mixing ceramic powders having the above-mentioned respective particle sizes at the above-mentioned blending ratio, it is possible to provide a porous ceramic member 20.

With respect to the material forming the adhesive layer 14, not particularly limited, examples thereof include an inorganic binder, an organic binder and a material made from inorganic fibers and/or inorganic particles.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof include ceramic fibers, such as silica-alumina, mullite, alumina, silica and the like. Each of these may be used alone or two or more kinds of these may be used in combination. Among the inorganic fibers, silica-alumina fibers are more desirably used.

With respect to the inorganic particles, examples thereof include carbides and nitrides, and specific examples include inorganic powder or whiskers made from silicon carbide, silicon nitride and boron nitride. Each of these may be used alone, or two or more kinds of these may be used in combination. Among the inorganic fine particles, silicon carbide having superior thermal conductivity is desirably used.

Moreover, the adhesive layer 14 may contain a foaming material. Thus, the foaming material is capable of changing the porosity of the adhesive layer 14, and consequently adjusts the thermal expansion coefficient $\alpha_L$ and Young's modulus of the adhesive layer 14.

With respect to the foaming material, not particularly limited as long as it is decomposed upon heating at the time of use, examples thereof include known foaming materials, such as ammonium hydrogen carbonate, ammonium carbonate, amyl acetate, butyl acetate, diazo amino benzene and the like.

Moreover, the adhesive layer 14 may contain a resin such as a thermoplastic resin and a thermosetting resin, balloons made from an inorganic substance and an organic substance, and the like. These materials make it possible to control the porosity of the adhesive layer 14, and consequently to adjust the thermal expansion coefficient $\alpha_L$ and Young's modulus of the adhesive layer 14.

With respect to the thermoplastic resin, not particularly limited, examples thereof include: acrylic resin, phenoxy resin, polyether sulfone, polysulfone and the like, and with respect to the above-mentioned thermosetting resin, not particularly limited, examples thereof include: epoxy resin, phenol resin, polyimide resin, polyester resin, bismaleimide resin, polyolefin-based resin, polyphenylene ether resin and the like.

With respect to the shape of these resins, not particularly limited, examples thereof include any shapes, such as a spherical shape, an elliptical shape, a cube shape, unfixed lump shape, a column shape, plate shape and the like.

In the case of the resin of the spherical shape, the average particle size is desirably set in a range from 30 to 300 μm.

Here, the balloon means a concept including the bubble and the hollow sphere shape, and with respect to the above-mentioned organic balloon, not particularly limited, examples thereof include acrylic balloons and polyester balloons; and with respect to the above-mentioned inorganic balloon, not particularly limited, examples thereof include alumina balloons, glass micro-balloons, shirasu balloons, fly ash balloons (FA balloons), mullite balloons and the like.

The shape and the average particle size of these balloons are desirably set in the same manner as the above-mentioned resins.

Here, the inclusion of the foaming agent, the resin such as a thermoplastic resin and a thermosetting resin, and the organic balloons in the adhesive layer 14 makes it possible to adjust the thermal expansion coefficient $\alpha_L$ and Young's modulus of the adhesive layer 14 because of the following reasons. At the time of formation of the honeycomb filter of the present invention, the above-mentioned materials are dispersed in the bonding agent layer in an almost uniform state; however, when the honeycomb filter is actually used, thus they are heated to a high temperature, the organic components such as the foaming material and the like are decomposed to be burned so that pores are formed in the adhesive layer. It is assumed that: at this time, by adjusting the porosity, the pore diameter and the like of the pores formed in the adhesive layer, the thermal expansion coefficient $\alpha_L$ of the adhesive layer and Young's modulus of the adhesive layer can be adjusted to appropriate values. As a result, the relational expression, $|\alpha_L-\alpha_F|/\alpha_F$, between the thermal expansion coefficient $\alpha_L$ of the adhesive layer and the thermal expansion coefficient $\alpha_F$ of the porous ceramic member is set within the above-mentioned range. Here, in the case where the inorganic balloons are contained therein, they adjust the porosity and the like while remaining in the adhesive layer.

Here, the above-mentioned adhesive layer 14 is defined as the state prior to the actual application to the honeycomb filter of the present invention, that is, the state in which the adhesive layer has never been heated by exhaust gases and the like; therefore, when the honeycomb filter of the present invention is used so that the adhesive layer 14 is heated to a high temperature by exhaust gases and the like, the organic components such as the organic binder, the foaming material, the resin and the organic balloons are decomposed and burned to be eliminated.

In the honeycomb filter 10 shown in FIG. 1, the shape of the ceramic block 15 is a column shape; however, in the honeycomb filter of the present invention, the shape of the ceramic block is not limited to the column shape, and may be formed into a desired shape such as an elliptical column shape or a rectangular column shape.

Moreover, with respect to the sealing material layer 13 formed on the circumference of the ceramic block 15, not particularly limited, for example, the same material as that of the adhesive layer 14 may be used.

Furthermore, the honeycomb filter of the present invention may support a catalyst capable of purifying CO, HC, NOx and the like in the exhaust gases.

When such a catalyst is supported thereon, the honeycomb filter of the present invention is allowed to function as a filter capable of collecting particulates in exhaust gases, and also to function as a catalyst converter for purifying CO, HC, NOx and the like contained in exhaust gases.

With respect to the catalyst to be supported on the honeycomb filter of the present invention, not particularly limited as long as it can purify CO, HC, NOx and the like, examples thereof include noble metals such as platinum, palladium and rhodium. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the present invention in which the above-mentioned catalyst is supported is allowed to function as a gas-purifying device in the same manner as the conventionally known DPFs with catalyst (Diesel-Particulate-Filter). Therefore, in the following description, the detailed explanation of the case in which the honeycomb filter of the present invention also serves as a catalyst-supporting member is omitted.

As described above, in the honeycomb filter of the present invention, the thermal expansion coefficient $\alpha_L$ of the adhesive layer and the thermal expansion coefficient $\alpha_F$ of the porous ceramic member are designed to have the following relationship: $0.01 < |\alpha_L - \alpha_F|/\alpha_F < 1.0$. In other words, in the constituent components of the honeycomb filter of the present invention, the thermal expansion coefficient of the adhesive layer and the thermal expansion coefficient of the porous ceramic member are not the same, but slightly different from each other. For this reason, even in the case where local burning, that is, a local temperature change, occurs due to: unevenness in the accumulated amount of particulates; unevenness in the amount of catalyst in the case of allowing the filter to support the catalyst; uneven heating caused by a heater and exhaust gases and the like, the honeycomb filter of the present invention makes it possible to properly alleviate a local thermal stress that is exerted between the portion having the local temperature change and portions other than this portion, thereby preventing occurrence of cracks in the porous ceramic member and the bonding agent layer.

Therefore, the honeycomb filter of the present invention has superior strength and durability.

Next, referring to FIGS. 1 and 2, the following description will discuss one example of a manufacturing method for the honeycomb filter of the present invention.

In order to manufacture the honeycomb filter of the present invention, first, a ceramic laminated body that forms a ceramic block 15 is produced.

This ceramic laminated body has a rectangular column-shaped structure in that a plurality of rectangular column-shaped porous ceramic members 20, each having a structure in that a number of through holes 21 are arranged side by side in the length direction with partition wall 23 interposed therebetween, are combined with one another through adhesive layers 14.

Upon manufacturing the porous ceramic member 20, first, a binder and a dispersant solution are added to the above-mentioned ceramics powder to prepare a mixed composition.

With respect to the above-mentioned binder, not particularly limited, examples thereof include: methylcellulose, carboxy methylcellulose, hydroxy ethylcellulose, polyethylene glycol, phenol resin, epoxy resin and the like.

The blended amount of the above-mentioned binder is desirably set to 1 to 10 parts by weight with respect to 100 parts by weight of ceramic powder.

With respect to the dispersant solution, not particularly limited, examples thereof include: an organic solvent such as benzene; alcohol such as methanol; and water.

An appropriate amount of the above-mentioned dispersant solution is mixed therein so that the viscosity of the mixed composition is set within a fixed range.

These ceramic powder, binder and dispersant solution are mixed by an attritor or the like, and sufficiently kneaded by a kneader or the like, and then extrusion-formed so that a column-shaped raw formed body having almost the same shape as the porous ceramic member shown in FIG. 2 is produced.

After the above-mentioned raw formed body has been dried by using a microwave drier or the like, a mouth-sealing process which injects a sealant material (plug) to predetermined through holes, and this is again subjected to a drying process using a microwave drier or the like.

With respect to the above-mentioned sealant material (plug), not particularly limited, for example, the same material as the above-mentioned mixed composition may be used.

Next, the raw formed body that has been subjected to the mouth-sealing process is heated at around 400 to 650° C. in an oxygen-containing atmosphere so as to be degreased so that the binder and the like are decomposed and eliminated to allow only the ceramic powder to remain therein.

Next, the raw formed body that has been degreased is sintered by heating at 1400 to 2200° C. in an inert gas atmosphere such as argon so that the ceramics powder is sintered to produce a porous ceramic member 20.

Here, the thermal expansion coefficient $\alpha_F$ of the porous ceramic member 20 thus formed is determined by a ceramics material to be used.

Figure 3:
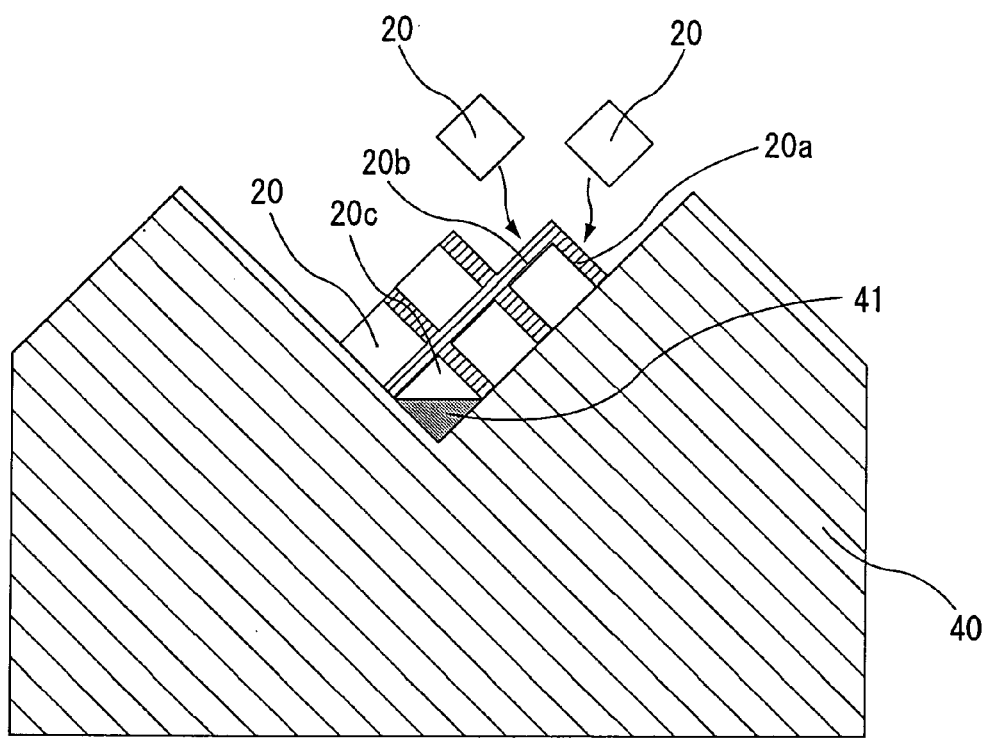
FIG. 3 is a side view that schematically shows manufacturing processes of the honeycomb filter of the present invention.
Figure 4:
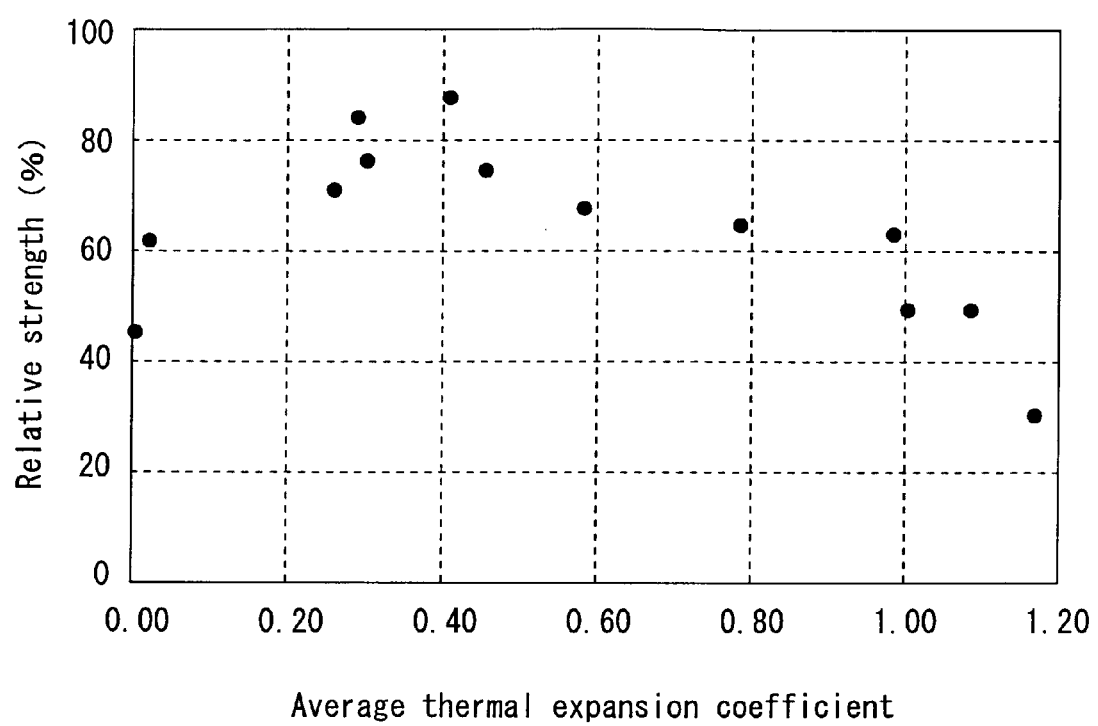
FIG. 4 is a graph that shows the relationship between the push-out strength ratio before and after a particulate collection test and the thermal expansion coefficient of each of honeycomb filters according to Examples 1 to 9 and Comparative Examples 1 to 4.

Next, as shown in FIG. 3, the ceramic laminated body is manufactured.

In other words, first, porous ceramic members 20 are placed on a base 30, the upper portion of which is designed to have a V-shape in its cross-section so as to allow the porous ceramic members 20 to be stacked thereon in a tilted manner, and adhesive paste to form an adhesive layer 14 is then applied onto two side faces 20a and 20b facing upward with an even thickness to form an adhesive paste layer; thereafter, a laminating process for forming another porous ceramic member 20 on this adhesive paste layer is successively repeated so that a rectangular column-shaped ceramic laminated body having a predetermined size is manufactured. At this time, with respect to the porous ceramic members 20 corresponding to four corners of the ceramic laminated body, a triangular column-shaped porous ceramic member 20c, which is formed by cutting a quadrangular column-shaped porous ceramic member into two, is bonded to a resin member 41 having the same shape as the triangular column-shaped porous ceramic member 20c by using a both-sided tape with easy peelability to prepare a corner member, and the bonded corner members are used for the four corners of the ceramic laminated body, and after the lamination processes of the porous ceramic members 20, all the resin members 41 forming the four corners of the ceramic laminated body are removed; thus, a ceramic laminated body having a polygonal column-shape in its cross section may be formed. Thus, it is possible to reduce the quantity of a waste corresponding to porous ceramic members to be disposed of, after the formation of the ceramic block 15 by cutting the peripheral portion of the ceramic laminated body.

With respect to a method for manufacturing the ceramic laminated body having a polygonal column-shape in its cross section except for the method shown in FIG. 3, for example, a method in which the porous ceramic members to be located on four corners are omitted, and a method in which porous ceramic members having a triangular shape are combined with one another may be used in accordance with the shape of a honeycomb filter to be manufactured. Here, a quadrangular column-shaped ceramic laminated body may of course be manufactured.

Further, this ceramic laminated body is heated in a temperature range from 50 to 100° C. for about 1 hour so that the adhesive paste layer is dried and solidified to form an adhesive layer 14; thereafter, by cutting the peripheral portion thereof by using a diamond cutter or the like into a shape as shown in FIG. 1, thus a ceramic block 15 is formed.

With respect to the material for forming the adhesive layer 14, not particularly limited, for example, the above-mentioned adhesive paste-containing materials such as an inorganic binder, an organic binder, inorganic fibers and inorganic particles may be used.

Moreover, the above-mentioned adhesive paste may contain small amounts of moisture, solvents and the like; and most of such moisture and solvents are normally scattered by heating and the like after application of the adhesive paste.

Here, it is necessary to adjust the thermal expansion coefficient $\alpha_L$ of the adhesive layer 14 so as to allow the thermal expansion coefficient $\alpha_L$ of the adhesive layer 14 and the thermal expansion coefficient $\alpha_F$ of the porous ceramic member 20 to satisfy the following relationship: $0.01 < |\alpha_L - \alpha_F|/\alpha_F < 1.0$.

In order to adjust the thermal expansion coefficient $\alpha_L$ of the adhesive layer 14, it is necessary to change the material blend, the porosity and the materials. The method thereof is not particularly limited, and examples thereof include: a method in which the above-mentioned foaming material and resins, such as a thermoplastic resin and a thermosetting resin, as well as organic balloons, are added to the above-mentioned adhesive paste; and a method in which the stirring time of the adhesive paste to be prepared is changed; and the like.

Moreover, the lower limit of the content of the inorganic binder is desirably set to 1% by weight, more desirably, to 5% by weight, on the solid component basis. The upper limit of the content of the inorganic binder is desirably set to 30% by weight, more desirably 15% by weight, most desirably 9% by weight, on the solid component basis. The content of the inorganic binder of less than 1% by weight tends to cause degradation in the bonding strength; in contrast, the content exceeding 30% by weight tends to cause degradation in the thermal conductivity.

The lower limit of the content of the above-mentioned organic binder is desirably set to 0.1% by weight, more desirably 0.2% by weight, most desirably 0.4% by weight, on the solid component basis. The upper limit of the content of the organic binder is desirably set to 5.0% by weight, more desirably 1.0% by weight, most desirably 0.6% by weight, on the solid component basis. The content of the organic binder of less than 0.1% by weight tends to cause a difficulty in preventing migration of the adhesive layer 14, while the content exceeding 5.0% by weight tends to cause the problem that the organic binder is burned to be lost to cause degradation in the bonding strength, when the adhesive layer 14 is exposed to high temperature.

The lower limit of the content of the above-mentioned inorganic fibers is desirably set to 10% by weight, more desirably 20% by weight, on the solid component basis. The upper limit of the content of the inorganic fibers is desirably set to 70% by weight, more desirably 40% by weight, most desirably 30% by weight, on the solid component basis. The content of the inorganic fibers of less than 10% by weight tends to cause degradation in the elasticity and strength, while the content exceeding 70% by weight tends to cause degradation in the thermal conductivity and a decrease in its effects as an elastic member.

The lower limit of the content of the above-mentioned inorganic particles is desirably set to 3% by weight, more desirably 10% by weight, most desirably 20% by weight, on the solid component basis. The upper limit of the content of the inorganic particles is desirably set to 80% by weight, more desirably 60% by weight, most desirably 40% by weight, on the solid component basis. The content of the inorganic particles of less than 3% by weight tends to cause a decrease in the thermal conductivity, while the content exceeding 80% by weight tends to cause degradation in the bonding strength, when the adhesive layer 14 is exposed to high temperature.

The lower limit of the shot content of the above-mentioned inorganic fibers is desirably set to 1% by weight, while the upper limit thereof is desirably set to 10% by weight, more desirably 5% by weight, most desirably 3% by weight. Moreover, the lower limit of the fiber length is desirably set to 1 mm, while the upper limit thereof is desirably set to 100 mm, more desirably 50 mm, most desirably 20 mm.

It is difficult to set the shot content to less than 1% by weight in the manufacturing, and the shot content exceeding 10% by weight tends to damage the wall faces of the porous ceramic members 20. Moreover, the fiber length of less than 1 mm makes it difficult to form a honeycomb filter 10 with proper elasticity, while the fiber length exceeding 100 mm tends to form a shape like a pill to cause insufficient dispersion of the inorganic particles, failing to make the thickness of the adhesive layer 14 thinner.

The lower limit of the particle size of the inorganic powder is desirably set to 0.01 μm, more desirably 0.1 μm. The upper limit of the particle size of the inorganic particles is desirably set to 100 μm, more desirably 15 μm, most desirably 10 μm. The particle size of the inorganic particles of less than 0.01 μm tends to cause high costs, while the particle size of the inorganic particles exceeding 100 μm tends to cause a decrease in the filling rate and the subsequent degradation in the bonding strength and thermal conductivity.

In addition to the above-mentioned inorganic fibers, inorganic binder, organic binder and inorganic particles, the adhesive paste may also contain moisture and other solvents such as acetone and alcohol at a total weight of 35 to 65% by weight in order to make the adhesive paste softer to impart the fluidity thereto so as to be easily applied, and the viscosity of the bonding agent paste is desirably set in a range from 15 to 25 Pa·s (10000 to 20000 cps (cP)).

Next, a sealing material forming process is carried out so as to form a sealing material layer 13 on the circumference of the ceramic block 15 thus formed.

In this sealing material forming process, first, the ceramic block 15 is rotated around an axis on which it is supported in the length direction.

The rotation speed of the ceramic block 15 is not limited, however it is desirably set in a range from 2 to 10 $\text{min}^{-1}$.

Successively, sealing material paste is adhere to the circumferential portion of the rotating ceramic block 15. With respect to the sealing material paste, not particularly limited, the same adhesive paste as described above may be used.

Next, the sealing material paste layer thus formed is dried at a temperature of about 120° C. to evaporate moisture to form a sealing material layer 13, thus the manufacturing process of the honeycomb filter 10 of the present invention in which the sealing material layer 13 is formed on the circumferential portion of the ceramic block 15 as shown in FIG. 1 is completed.

BEST MODE FOR CARRYING OUT THE INVENTION

The following description will discuss the present invention in detail by means of examples; however, the present invention is not intended to be limited by these examples.

EXAMPLE 1

(1) Powder of α-type silicon carbide having an average particle size of 5 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a kneaded matter. Next, after a slight amount of a plasticizer and a lubricant had been added to the kneaded matter and this had been further kneaded, the resulting kneaded matter was extrusion-molded, so that a raw formed product was manufactured.

Next, the above-mentioned raw formed product was dried by using a micro-wave drier, and predetermined through holes were then filled with a paste having the same composition as the raw formed product, and after this had been again dried by using a drier, this was degreased at 400° C., and sintered at 2200° C. in a normal-pressure argon atmosphere for 3 hours to manufacture a porous ceramic member as shown in FIG. 2, which was made of a silicon carbide sintered body, and had a size of 33 mm×33 mm×300 mm, the number of through holes of 31 pcs/cm$^2$ and a thickness of the partition wall of 0.3 mm.

(2) A number of the porous ceramic members were combined with one another by using a heat resistant adhesive paste, which was prepared by adding 20 parts by weight of water to 100 parts by weight of a mixture composed of 17.6% by weight of alumina fibers having a fiber length of 0.2 mm, 61.0% by weight of silicon carbide particles having an average particle size of 0.6 μm, 9.1% by weight of silica sol, 2.3% by weight of carboxymethyl cellulose and 10% by weight of ammonium hydrogen carbonate serving as a foaming material, by carrying out the processes as explained by reference to FIG. 3. Then, it was cut by using a diamond cutter; thus, cylinder-shaped ceramic block having a diameter of 165 mm, as shown in FIG. 1, was obtained.

Next, 23.3% by weight of ceramic fibers made from alumina silicate (shot content: 3%, fiber length: 0.1 to 100 mm), which served as inorganic fibers, 30.2% by weight of silicon carbide powder having an average particle size of 0.3 μm, which served as inorganic particles, 7% by weight of silica sol ($SiO_2$ content in the sol: 30% by weight), which served as an inorganic binder, 0.5% by weight of carboxymethyl cellulose, which served as an organic binder, and 39% by weight of water were mixed and kneaded to prepare a sealing material paste.

Next, a sealing material paste layer having a thickness of 1.0 mm was formed on the circumferential portion of the ceramic block by using the above-mentioned sealing material paste. Further, this sealing material paste layer was dried at 120° C. so that a cylinder-shaped honeycomb filter as shown in FIG. 1 was manufactured.

EXAMPLE 2

(1) The same processes as (1) of Example 1 were carried out to obtain a porous ceramic member.

(2) The same processes as Example 1 were carried out to manufacture a honeycomb filter except that, as a heat-resistant adhesive paste, the following paste was used: that is a paste prepared by adding 25 parts by weight of water to 100 parts by weight of a mixture composed of 15. 7% by weight of alumina fibers having a fiber length of 0.2 mm, 54.2% by weight of silicon carbide particles having an average particle size of 0.6 μm, 8.1% by weight of silica sol, 2.0% by weight of carboxy methyl cellulose and 20% by weight of ammonium hydrogen carbonate serving as a foaming agent, was used to manufacture a honeycomb filter.

EXAMPLE 3

(1) The same processes as (1) of Example 1 were carried out to obtain a porous ceramic member.

(2) The same processes as Example 1 were carried out to manufacture a honeycomb filter except that, as a heat-resistant adhesive paste, the following paste was used: that is, a paste prepared by adding 35 parts by weight of water to 100 parts by weight of a mixture composed of 13.7% by weight of alumina fibers having a fiber length of 0.2 mm, 47.4% by weight of silicon carbide particles having an average particle size of 0.6 μm, 7.1% by weight of silica sol, 1.8% by weight of carboxy methyl cellulose and 30% by weight of ammonium hydrogen carbonate serving as a foaming agent.

EXAMPLE 4

(1) The same processes as (1) of Example 1 were carried out to obtain a porous ceramic member.

(2) The same processes as Example 1 were carried out to manufacture a honeycomb filter except that, as a heat-resistant adhesive paste, the following paste was used: that is, a paste prepared by adding 40 parts by weight of water to 100 parts by weight of a mixture composed of 6.7% by weight of alumina fibers having a fiber length of 0.2 mm, 30.8% by weight of silicon carbide particles having an average particle size of 0.6 μm, 20.6% by weight of silica sol, 1.7% by weight of carboxy methyl cellulose and 40.2% by weight of fly ash balloons.

EXAMPLE 5

(1) The same processes as (1) of Example 1 were carried out to obtain a porous ceramic member.

(2) The same processes as Example 1 were carried out to manufacture a honeycomb filter except that, as a heat-resistant adhesive paste, the following paste was used: that is, a paste prepared by adding 40 parts by weight of water to 100 parts by weight of a mixture composed of 6.7% by weight of alumina fibers having a fiber length of 0.2 mm, 30.8% by weight of silicon carbide particles having an average particle size of 0.6 μm, 20.6% by weight of silica sol, 1.7% by weight of carboxy methyl cellulose and 40.2% by weight of alumina balloons.

EXAMPLE 6

(1) The same processes as (1) of Example 1 were carried out to obtain a porous ceramic member.

(2) The same processes as Example 1 were carried out to manufacture a honeycomb filter except that, as a heat-resistant adhesive paste, the following paste was used: that is, a paste prepared by adding 35 parts by weight of water to 100 parts by weight of a mixture composed of 13.7% by weight of alumina fibers having a fiber length of 0.2mm, 47.4% by weight of silicon carbide particles having an average particle size of 0.6 μm, 7.1% by weight of silica sol, 1.8% by weight of carboxy methyl cellulose and 30% by weight of spherical acrylic resin (average particle size: 10 μm).

EXAMPLE 7

(1) The same processes as (1) of Example 1 were carried out to obtain a porous ceramic member.

(2) The same processes as Example 1 were carried out to manufacture a honeycomb filter except that, as a heat-resistant adhesive paste, the following paste was used: that is, a paste prepared by adding 35 parts by weight of water to 100 parts by weight of a mixture composed of 13.7% by weight of alumina fibers having a fiber length of 0.2 mm, 47.4% by weight of silicon carbide particles having an average particle size of 0.6 μm, 7.1% by weight of silica sol, 1.8% by weight of carboxy methyl cellulose and 30% by weight of organic balloons comprising acryl (average particle size: 10 μm).

EXAMPLE 8

(1) The same processes as (1) of Example 1 were carried out to obtain a porous ceramic member.

(2) The same processes as Example 1 were carried out to manufacture a honeycomb filter except that, as a heat-resistant adhesive paste, the following paste was used: that is, a paste prepared by adding 40 parts by weight of water to 100 parts by weight of a mixture composed of 6.7% by weight of alumina fibers having a fiber length of 0.2 mm, 30.8% by weight of silicon carbide particles having an average particle size of 0.6 μm, 20.6% by weight of silica sol, 1.7% by weight of carboxy methyl cellulose, 10% by weight of ammonium hydrogen carbonate and 30.2% by weight of alumina balloons.

EXAMPLE 9

(1) The same processes as (1) of Example 1 were carried out to obtain a porous ceramic member.

(2) The same processes as Example 1 were carried out to manufacture a honeycomb filter except that, as a heat-resistant adhesive paste, the following paste was used: that is, a paste prepared by adding 40 parts by weight of water to 100 parts by weight of a mixture composed of 6.7% by weight of alumina fibers having a fiber length of 0.2mm, 30.8% by weight of silicon carbide particles having an average particle size of 0.6 μm, 20.6% by weight of silica sol, 1.7% by weight of carboxy methyl cellulose, 20% by weight of ammonium hydrogen carbonate and 20.2% by weight of alumina balloons.

COMPARATIVE EXAMPLE 1

(1) The same processes as (1) of Example 1 were carried out to obtain a porous ceramic member.

(2) The same processes as Example 1 were carried out to manufacture a honeycomb filter except that, as an adhesive paste, the following paste was used: that is, an adhesive paste, prepared by adding 43 parts by weight of water to 100 parts by weight of a mixture composed of 37% by weight of alumina fibers having a fiber length of 0.2 mm, 49.7% by weight of silicon carbide particles having an average particle size of 0.6 μm, 12.3% by weight of silica sol and 1.0% by weight of carboxy methyl cellulose.

COMPARATIVE EXAMPLE 2

(1) The same processes as (1) of Example 1 were carried out to obtain a porous ceramic member.

(2) The same processes as Example 1 were carried out to manufacture a honeycomb filter except that, as an adhesive paste, the following paste was used: that is, an adhesive paste, prepared by mixing 34 parts by weight of water to 100 parts by weight of a mixture composed of 15.1% by weight of alumina fibers having a fiber length of 0.2 mm, 17.5% by weight of silicon carbide particles having an average particle size of 0.6 μm, 61.5% by weight of silica sol and 5.9% by weight of carboxy methyl cellulose.

COMPARATIVE EXAMPLE 3

(1) The same processes as (1) of Example 1 were carried out to obtain a porous ceramic member.

(2) The same processes as Example 1 were carried out to manufacture a honeycomb filter except that, as an adhesive paste, the following paste was used: that is, a paste prepared by mixing 35 parts by weight of water to 100 parts by weight of a mixture composed of 13.7% by weight of alumina fibers having a fiber length of 0.2 mm, 27.4% by weight of silicon carbide particles having an average particle size of 0.6 μm, 7.1% by weight of silica sol, 1.8% by weight of carboxy methyl cellulose and 50% by weight of ammonium hydrogen carbonate.

COMPARATIVE EXAMPLE 4

(1) The same processes as (1) of Example 1 were carried out to obtain a porous ceramic member.

(2) The same processes as Example 1 were carried out to manufacture a honeycomb filter except that, as an adhesive paste, the following paste was used: that is, an adhesive paste, prepared by adding 50 parts by weight of water in 100 parts by weight of a mixture composed of 27% by weight of alumina fibers having a fiber length of 0.2 mm, 39.7% by weight of silicon carbide particles having an average particle size of 0.6 μm, 12.3% by weight of silica sol, 1.0% by weight of carboxy methyl cellulose and 20% by weight of ammonium hydrogen carbonate.

The thermal expansion coefficient $\alpha_F$ of each of the porous ceramic members and the thermal expansion coefficient $\alpha_L$ of the adhesive layer of each of the honeycomb filters thus manufactured according to Examples 1 to 9 and Comparative Examples 1 to 4 were measured at respective temperatures of 300° C., 400° C., 600° C., 750° C. and 900° C. (Table 1) and, based upon these values, the value of $|\alpha_L-\alpha_F|/\alpha_F$ was calculated (Table 2).

Moreover, each of the honeycomb filters according to Examples 1 to 9 and Comparative Examples 1 to 4 was placed on a base having a hollow round-shape, and the honeycomb filter was supported at the portion of the porous ceramic members which is close to the circumference thereof so that, in this state, a force is applied onto one of the porous ceramic members near the center downward in a manner so as to push it out; thus, a push-out test for measuring a force needed to break the honeycomb filter was measured.

Furthermore, each of the honeycomb filters according to Examples 1 to 9 and Comparative Examples 1 to 4 was placed in an exhaust passage of an engine, and this was subjected to repeated particulate collection tests of 100 times, and then subjected to the same push-out test; thus, the degree of a decrease in the push-out strength after the particulate collection tests was calculated.

The results are shown in Table 3.

TABLE 1

| | Thermal expansion coefficient (×10⁻⁶)1/K | | | | |
|---|---|---|---|---|---|
| | 300° C. | 400° C. | 600° C. | 750° C. | 900° C. |
| Porous ceramic member ($\alpha_F$) | 5.7 | 5.3 | 3.5 | 3.4 | 3.9 |
| Example 1 ($\alpha_L$) | 6.3 | 6.2 | 5.2 | 4.8 | 2.7 |
| Example 2 ($\alpha_L$) | 6.3 | 6.7 | 5.3 | 5.9 | 6.4 |
| Example 3 ($\alpha_L$) | 7.5 | 7.4 | 6.3 | 5.9 | 6.4 |
| Example 4 ($\alpha_L$) | 6.4 | 6.7 | 5.3 | 5.0 | 4.3 |
| Example 5 ($\alpha_L$) | 7.5 | 7.4 | 6.3 | 4.1 | 2.7 |
| Example 6 ($\alpha_L$) | 4.6 | 4.8 | 3.6 | 3.7 | 7.3 |
| Example 7 ($\alpha_L$) | 5.8 | 5.4 | 3.6 | 3.5 | 4.0 |
| Example 8 ($\alpha_L$) | 10.3 | 9.7 | 6.3 | 5.7 | 6.9 |
| Example 9 ($\alpha_L$) | 11.2 | 10.0 | 7.2 | 6.8 | 7.7 |
| Comparative Example 1 ($\alpha_L$) | 12.3 | 10.6 | 7.34 | 7.2 | 7.83 |
| Comparative Example 2 ($\alpha_L$) | 5.69 | 5.28 | 3.47 | 3.39 | 3.92 |
| Comparative Example 3 ($\alpha_L$) | 11.4 | 10.6 | 7.1 | 6.9 | 7.8 |
| Comparative Example 4 ($\alpha_L$) | 12.4 | 11.3 | 7.5 | 7.4 | 8.64 |

TABLE 2

| | $|\alpha_L-\alpha_F|/\alpha_F$ | | | | | |
|---|---|---|---|---|---|---|
| | 300° C. | 400° C. | 600° C. | 750° C. | 900° C. | Average |
| Example 1 | 0.11 | 0.17 | 0.49 | 0.41 | 0.31 | 0.30 |
| Example 2 | 0.11 | 0.26 | 0.51 | 0.74 | 0.64 | 0.45 |
| Example 3 | 0.32 | 0.40 | 0.80 | 0.74 | 0.64 | 0.58 |
| Example 4 | 0.12 | 0.26 | 0.51 | 0.47 | 0.10 | 0.29 |
| Example 5 | 0.32 | 0.40 | 0.80 | 0.21 | 0.31 | 0.41 |
| Example 6 | 0.19 | 0.09 | 0.03 | 0.09 | 0.87 | 0.26 |
| Example 7 | 0.02 | 0.02 | 0.03 | 0.03 | 0.03 | 0.024 |
| Example 8 | 0.81 | 0.83 | 0.80 | 0.68 | 0.77 | 0.78 |
| Example 9 | 0.96 | 0.89 | 1.06 | 1.00 | 0.97 | 0.98 |
| Comparative Example 1 | 1.16 | 1.00 | 1.10 | 1.12 | 1.01 | 1.08 |
| Comparative Example 2 | 0.002 | 0.004 | 0.009 | 0.003 | 0.005 | 0.004 |
| Comparative Example 3 | 1.00 | 1.00 | 1.03 | 1.03 | 1.00 | 1.01 |
| Comparative Example 4 | 1.18 | 1.13 | 1.14 | 1.18 | 1.22 | 1.17 |

TABLE 3

| | Push-out test (N) | | Relative strength (%) |
|---|---|---|---|
| | Before collection test | After collection test | |
| Example 1 | 17150 | 13230 | 77 |
| Example 2 | 26861 | 20011 | 74 |
| Example 3 | 22128 | 14886 | 67 |
| Example 4 | 19129 | 15885 | 83 |
| Example 5 | 16199 | 14031 | 87 |
| Example 6 | 25303 | 17870 | 71 |
| Example 7 | 15982 | 9800 | 61 |
| Example 8 | 22341 | 14294 | 64 |
| Example 9 | 20341 | 12700 | 62 |
| Comparative Example 1 | 17640 | 8918 | 51 |
| Comparative Example 2 | 19411 | 8948 | 46 |
| Comparative Example 3 | 18341 | 9265 | 51 |
| Comparative Example 4 | 17345 | 5364 | 31 |

As shown in Table 2, all the values $|\alpha_L-\alpha_F|/\alpha_F$ of the honeycomb filters according to Examples 1 to 9 are set within a range from 0.01 to 1.0; however, all the values $|\alpha_L-\alpha_F|/\alpha_F$ of the honeycomb filters according to Comparative Examples 1, 3 and 4 are greater than 1.0 as a whole, and the values $|\alpha_L-\alpha_F|/\alpha_F$ of the honeycomb filter according to Comparative Example 2 are smaller than 0.01 as a whole.

Here, the values $|\alpha_L-\alpha_F|/\alpha_F$ of the honeycomb filter according to Example 9 obtained at 600° C. and 750° C. are 1.0 or more; however, the average value is 0.98, which is less than 1.0.

Moreover, as shown in Table 3, the results of the push-out tests indicate that each of the push-out strengths before the collection test of particulates in accordance with the honeycomb filters of Examples 1 to 9 exceeds 14700 N (1500 kgf) and that each of the push-out strengths after the collection test of particulates exceeds 9800 N (1000 kgf).

In contrast, each of the push-out strengths before the collection test of particulates in accordance with the honeycomb filters of Comparative Examples 1 to 4 is set in a range from 17345 N (1770 kgf) to 19411 N (1981 kgf), and each of the push-out strengths after the collection test of particulates is set in a range from 5364 N (547 kgf) to 9265 N (945 kgf), and in any of the cases, before the collection test of particulates, the push-out strengths have the same level as those of the honeycomb filters according to Examples 1 to 9; however, after the collection test of particulates, the push-out strengths are inferior to those of the honeycomb filters according to Examples 1 to 9.

In other words, as shown in Table 3, each of the relative strengths (strength after collection test/strength before collection test×100) after the collection test of particulates of the honeycomb filters according to Examples 1 to 9 is 60% or more so that a decrease in the strength is not so great; however, each of the relative strengths (strength after collection test/strength before collection test×100) after the collection test of particulates of the honeycomb filters according to Comparative Examples 1 to 4 is less than 60%, resulting in a great decrease in the strength.

EXAMPLE 10

(1) Powder of α-type silicon carbide having an average particle size of 10 µm (70% by weight) and powder of β-type silicon carbide having an average particle size of 0.5 µm (30% by weight) were wet-mixed, and to 100 parts by weight of the resulting mixture were added and kneaded 15 parts by weight of an organic binder (methyl cellulose), 10 parts by weight of water and 5 parts by weight of acrylic resin to obtain a kneaded matter. Next, after a slight amount of a plasticizer and a lubricant had been added to the kneaded matter and this had been further kneaded, the resulting kneaded matter was extrusion-formed so that a raw formed product was manufactured.

Next, the above-mentioned raw formed product was dried by using a micro-wave drier, and predetermined through holes were then filled with a paste having the same composition as the raw formed product, and after this had been again dried by using a drier, this was degreased at 400° C., and sintered at 2200° C. in a normal-pressure argon atmosphere for 3 hours to manufacture a porous ceramic member as shown in FIG. 2, which was made of a silicon carbide sintered body, and had a size of 33 mm×33 mm×300 mm, the number of through holes of 31 pcs/cm$^2$, a thickness of the partition wall of 0.3 mm, a porosity of 50% by volume and an average pore diameter of 20 µm.

(2) The same processes as those of Example 2 were carried out except that the porous ceramic member manufactured in the above-mentioned processes (1) was used to manufacture a honeycomb filter for purifying exhaust gases.

EXAMPLE 11

The same processes as those of Example 3 were carried out except that the porous ceramic member manufactured in the processes (1) of Example 10 was used to manufacture a honeycomb filter for purifying exhaust gases.

EXAMPLE 12

The same processes as those of Example 4 were carried out except that the porous ceramic member manufactured in the processes (1) of Example 10 was used to manufacture a honeycomb filter for purifying exhaust gases.

EXAMPLE 13

The same processes as those of Example 7 were carried out except that the porous ceramic member manufactured in the processes (1) of Example 10 was used to manufacture a honeycomb filter for purifying exhaust gases.

EXAMPLE 14

The same processes as those of Example 8 were carried out except that the porous ceramic member manufactured in the processes (1) of Example 10 was used to manufacture a honeycomb filter for purifying exhaust gases.

EXAMPLE 15

The same processes as those of Example 9 were carried out except that the porous ceramic member manufactured in the processes (1) of Example 10 was used to manufacture a honeycomb filter for purifying exhaust gases.

REFERENCE EXAMPLE 1

The same processes as those of Example 1 were carried out except that the porous ceramic member manufactured in the processes (1) of Example 10 was used to manufacture a honeycomb filter for purifying exhaust gases.

REFERENCE EXAMPLE 2

The same processes as those of Example 5 were carried out except that the porous ceramic member manufactured in the processes (1) of Example 10 was used to manufacture a honeycomb filter for purifying exhaust gases.

REFERENCE EXAMPLE 3

The same processes as those of Example 6 were carried out except that the porous ceramic member manufactured in the processes (1) of Example 10 was used to manufacture a honeycomb filter for purifying exhaust gases.

COMPARATIVE EXAMPLE 5

The same processes as those of Comparative Example 1 were carried out except that the porous ceramic member manufactured in the processes (1) of Example 10 was used to manufacture a honeycomb filter for purifying exhaust gases.

COMPARATIVE EXAMPLE 6

The same processes as those of Comparative Example 2 were carried out except that the porous ceramic member manufactured in the processes (1) of Example 10 was used to manufacture a honeycomb filter for purifying exhaust gases.

COMPARATIVE EXAMPLE 7

The same processes as those of Comparative Example 3 were carried out except that the porous ceramic member manufactured in the processes (1) of Example 10 was used to manufacture a honeycomb filter for purifying exhaust gases.

COMPARATIVE EXAMPLE 8

The same processes as those of Comparative Example 4 were carried out except that the porous ceramic member manufactured in the processes (1) of Example 10 was used to manufacture a honeycomb filter for purifying exhaust gases.

COMPARATIVE EXAMPLE 9

(1) The same processes as those of (1) of Example 10 were carried out to manufacture a porous ceramic member.

(2) The same processes as those of Example 10 were carried out except that an adhesive paste, prepared by adding 1 part by weight of cement and 34 parts by weight of water to 100 parts by weight of a mixture composed of 15.1% by weight of alumina fibers having a fiber length of 0.2 mm, 17.5% by weight of silicon carbide particles having an average particle size of 0.6 μm, 61.5% by weight of silica sol and 5.9% by weight of carboxy methyl cellulose, was used to manufacture a honeycomb filter for purifying exhaust gases.

The thermal expansion coefficient $\alpha_F$ of each of the porous ceramic members thus manufactured and the thermal expansion coefficient $\alpha_L$ of the adhesive layer of each of the honeycomb filters according to Examples 10 to 15, Reference Examples 1 to 3 and Comparative Examples 5 to 9 were measured at respective temperatures of 300° C., 400° C., 600° C., 750° C. and 900° C. (Table 4) and based upon these values, the value of $(\alpha_L-\alpha_F)/\alpha_F$ was calculated (Table 5).

Moreover, each of the honeycomb filters according to Examples 10 to 15, Reference Examples 1 to 3 and Comparative Examples 5 to 9 was placed on a base having a hollow round-shape, and the honeycomb filter was supported at the portion of the porous ceramic members which is close to the circumference thereof so that, in this state, a force is applied onto one of the porous ceramic members near the center downward in a manner so as to push it out; thus, a push-out test for measuring a force to break the honeycomb filter was measured.

Furthermore, each of the honeycomb filters according to Examples 10 to 15, Reference Examples 1 to 3 and Comparative Examples 5 to 9 was placed in an exhaust passage of an engine, and this was subjected to repeated particulate collection tests, and after the tests of 100 times as well as 300 times, the resulting honeycomb filters were then subjected to the same push-out test; thus, the degree of a decrease in the push-out strength before and after the particulate collection tests was calculated.

The results are shown in Table 6.

TABLE 4

| | | Thermal expansion coefficient ($\times 10^{-6}$)1/K | | | | | Young's modulus |
|---|---|---|---|---|---|---|---|
| | | 300° C. | 400° C. | 600° C. | 750° C. | 900° C. | (GPa) |
| Porous ceramic member | | 5.65 | 5.25 | 3.45 | 3.38 | 3.9 | 35 |
| Adhesive layer | Example 10 | 6.3 | 6.7 | 5.3 | 5.9 | 6.4 | 21 |
| | Example 11 | 7.5 | 7.4 | 6.3 | 5.9 | 6.4 | 19.6 |
| | Example 12 | 6.4 | 6.7 | 5.3 | 5.0 | 4.3 | 17.5 |
| | Example 13 | 5.8 | 5.4 | 3.6 | 3.5 | 4.0 | 14 |
| | Example 14 | 10.3 | 9.7 | 6.3 | 5.7 | 6.9 | 9.1 |
| | Example 15 | 11.2 | 10.0 | 7.2 | 6.8 | 7.7 | 7 |
| | Reference Example 1 | 6.3 | 6.2 | 5.2 | 4.8 | 2.7 | 25.2 |
| | Reference Example 2 | 7.5 | 7.4 | 6.3 | 4.1 | 2.7 | 25.9 |
| | Reference Example 3 | 4.6 | 4.8 | 3.6 | 3.7 | 7.3 | 26.6 |
| | Comparative Example 5 | 12.3 | 10.6 | 7.34 | 7.2 | 7.83 | 12 |
| | Comparative Example 6 | 5.69 | 5.28 | 3.47 | 3.39 | 3.92 | 15 |
| | Comparative Example 7 | 11.4 | 10.6 | 7.1 | 6.9 | 7.8 | 18 |
| | Comparative Example 8 | 12.4 | 11.3 | 7.5 | 7.4 | 8.64 | 21.7 |
| | Comparative Example 9 | 5.69 | 5.28 | 3.46 | 3.39 | 3.91 | 25.2 |

TABLE 5

| | $(\alpha_L-\alpha_F)/\alpha_F$ | | | | | | Young's modulus ratio |
|---|---|---|---|---|---|---|---|
| | 300° C. | 400° C. | 600° C. | 750° C. | 900° C. | Average | (%) |
| Example 10 | 0.12 | 0.28 | 0.54 | 0.75 | 0.64 | 0.46 | 60 |
| Example 11 | 0.33 | 0.41 | 0.83 | 0.75 | 0.64 | 0.59 | 56 |
| Example 12 | 0.13 | 0.28 | 0.54 | 0.48 | 0.10 | 0.31 | 50 |
| Example 13 | 0.03 | 0.03 | 0.04 | 0.04 | 0.03 | 0.031 | 40 |
| Example 14 | 0.82 | 0.85 | 0.83 | 0.69 | 0.77 | 0.79 | 26 |
| Example 15 | 0.98 | 0.90 | 1.09 | 1.01 | 0.97 | 0.99 | 20 |
| Reference Example 1 | 0.12 | 0.18 | 0.51 | 0.42 | −0.31 | 0.18 | 72 |
| Reference Example 2 | 0.33 | 0.41 | 0.83 | 0.21 | −0.31 | 0.29 | 74 |

TABLE 5-continued

| | $(\alpha_L-\alpha_F)/\alpha_F$ | | | | | | Young's modulus ratio (%) |
|---|---|---|---|---|---|---|---|
| | 300° C. | 400° C. | 600° C. | 750° C. | 900° C. | Average | |
| Reference Example 3 | −0.19 | −0.09 | 0.04 | 0.09 | 0.87 | 0.15 | 76 |
| Comparative Example 5 | 1.18 | 1.02 | 1.13 | 1.13 | 1.01 | 1.09 | 34 |
| Comparative Example 6 | 0.007 | 0.006 | 0.006 | 0.003 | 0.005 | 0.005 | 43 |
| Comparative Example 7 | 1.02 | 1.02 | 1.06 | 1.04 | 1.00 | 1.03 | 51 |
| Comparative Example 8 | 1.19 | 1.15 | 1.17 | 1.19 | 1.22 | 1.19 | 62 |
| Comparative Example 9 | 0.007 | 0.006 | 0.003 | 0.003 | 0.003 | 0.004 | 72 |

TABLE 6

| | Before collection test Push-out test (N) | After collection tests of 100 times | | After collection tests of 300 times | | |
|---|---|---|---|---|---|---|
| | | Push-out test (N) | Relative strength <to that before collection tests> (%) | Push-out test (N) | Relative strength <to that before collection tests> (%) | Relative strength <to that after collection tests of 100 times> (%) |
| Example 10 | 26320 | 19410 | 74 | 17980 | 68 | 93 |
| Example 11 | 21685 | 14435 | 67 | 12117 | 56 | 84 |
| Example 12 | 18747 | 15408 | 82 | 12838 | 68 | 83 |
| Example 13 | 15662 | 9506 | 61 | 8931 | 57 | 94 |
| Example 14 | 21894 | 13865 | 63 | 12271 | 56 | 89 |
| Example 15 | 19934 | 12319 | 62 | 10603 | 53 | 86 |
| Reference Example 1 | 16807 | 12831 | 76 | 8756 | 52 | 68 |
| Reference Example 2 | 15875 | 13610 | 86 | 8685 | 55 | 64 |
| Reference Example 3 | 24800 | 17334 | 70 | 11869 | 48 | 68 |
| Comparative Example 5 | 17287 | 8359 | 48 | 6543 | 38 | 78 |
| Comparative Example 6 | 19023 | 8680 | 46 | 6745 | 35 | 78 |
| Comparative Example 7 | 17974 | 8987 | 50 | 6874 | 38 | 76 |
| Comparative Example 8 | 16998 | 5203 | 31 | 3962 | 23 | 76 |
| Comparative Example 9 | 18034 | 7845 | 44 | 5976 | 33 | 76 |

As shown in Table 5, all the values $(\alpha_L-\alpha_F)/\alpha_F$ of the honeycomb filters according to Examples 10 to 15 are set within a range from 0.01 to 1.0, and all the Young's modulus ratios (Young's modulus of adhesive layer/Young's modulus of porous ceramic member×100) are 60% or less. Here, the values $(\alpha_L-\alpha_F)/\alpha_F$ of the honeycomb filter according to Example 15 obtained at 600° C. and 750° C. are 1.0 or more; however, the average value is 0.99, which is less than 1.0.

In contrast, all the values $(\alpha_L-\alpha_F)/\alpha_F$ of the honeycomb filters according to Reference Examples 1 to 3 are within a range from 0.01 to 1.0; however, all the Young's modulus ratios exceed 60%.

All the values $(\alpha_L-\alpha_F)/\alpha_F$ of the honeycomb filters according to Comparative Examples 5, 7 and 8 are greater than 1.0, and all the values $(\alpha_L-\alpha_F)/\alpha_F$ of the honeycomb filters according to Comparative Examples 6 and 9 are smaller than 0.01. Moreover, all the Young's modulus ratios of the honeycomb filters according to Comparative Examples 5 to 7 are 60% or less, and all the Young's modulus ratios of the honeycomb filters according to Comparative Examples 8 and 9 exceed 60%.

As shown in Table 6, in the case of the honeycomb filters according to Examples 10 to 15 and Reference Examples 1 to 3 in which the values $(\alpha_L-\alpha_F)/\alpha_F$ of the honeycomb filters are set within a range from 0.01 to 1.0, all the relative strengths after collection tests of 100 times to those before the tests: (strength after collection tests of 100 times/strength before collection tests×100) are 61% or more, which is not so low in the strength decrease. However, in the case of the honeycomb filters according to Examples 10 to 15 in which the Young's modulus ratios are 60% or less, all the relative strengths after collection tests of 300 times to the strengths after the collection tests of 100 times: (strength after collection tests of 300 times/strength after collection tests of 100 times×100) are 83% or more, while in the case of the honeycomb filters according to Reference Examples 1 to 3 in which the Young's modulus ratios exceed 60%, the relative strengths after collection tests of 300 times to the strengths after the tests of 100 times are in a range from 64 to 68%, which is a low level.

With respect to the honeycomb filters according to Comparative Examples 5 to 9, all the push-out strengths before collection tests are the same as the push-out strengths of the honeycomb filters according to Examples 10 to 15 and Reference Examples 1 to 3; however, all the relative strengths after collection tests of 100 times to those before the tests are 50% or less, and all the relative strengths after collection tests of 300 times to those before the tests are 38% or less, which is great in the strength decrease.

EXAMPLE 16

(1) Powder of α-type silicon carbide having an average particle size of 20 μm (60% by weight) and metal silicon powder having an average particle size of 1.0 μm (40% by weight) were wet-mixed, and to 100 parts by weight of the resulting mixture were added and kneaded 5 parts by weight of an organic binder (methyl cellulose), 10 parts by weight of water and 5 parts by weight of acrylic resin to obtain a kneaded matter. Next, after a slight amount of a plasticizer and a lubricant had been added to the kneaded matter and this had been further kneaded, the resulting kneaded matter was extrusion-formed so that a raw formed product was manufactured.

Next, the above-mentioned raw formed product was dried by using a micro-wave drier, and predetermined through holes were then filled with a paste having the same composition as the raw formed product, and after this had been again dried by using a drier, this was degreased at 400° C., and sintered at 1600° C. in a normal-pressure argon atmosphere for 2 hours to manufacture a porous ceramic member as shown in FIG. 2, which was made of a silicon carbide/metal silicon sintered body, and had a size of 33 mm×33 mm×300 mm, the number of through holes of 31 pcs/cm², a thickness of the partition wall of 0.3 mm, a porosity of 50% by volume and an average pore diameter of 20 μm.

(2) The same processes as those of Example 7 were carried out except that the porous ceramic member manufactured in the above-mentioned processes (1) was used to manufacture a honeycomb filter for purifying exhaust gases.

EXAMPLE 17

The same processes as those of Example 8 were carried out except that the porous ceramic member manufactured in the processes (1) of Example 16 was used to manufacture a honeycomb filter for purifying exhaust gases.

EXAMPLE 18

The same processes as those of Example 9 were carried out except that the porous ceramic member manufactured in the processes (1) of Example 16 was used to manufacture a honeycomb filter for purifying exhaust gases.

REFERENCE EXAMPLE 4

The same processes as those of Example 2 were carried out except that the porous ceramic member manufactured in the processes (1) of Example 16 was used to manufacture a honeycomb filter for purifying exhaust gases.

REFERENCE EXAMPLE 5

The same processes as those of Example 3 were carried out except that the porous ceramic member manufactured in the processes (1) of Example 16 was used-to manufacture a honeycomb filter for purifying exhaust gases.

REFERENCE EXAMPLE 6

The same processes as those of Example 4 were carried out except that the porous ceramic member manufactured in the processes (1) of Example 16 was used to manufacture a honeycomb filter for purifying exhaust gases.

COMPARATIVE EXAMPLE 10

The same processes as those of Comparative Example 1 were carried out except that the porous ceramic member manufactured in the processes (1) of Example 16 was used to manufacture a honeycomb filter for purifying exhaust gases.

COMPARATIVE EXAMPLE 11

The same processes as those of Comparative Example 2 were carried out except that the porous ceramic member manufactured in the processes (1) of Example 16 was used to manufacture a honeycomb filter for purifying exhaust gases.

COMPARATIVE EXAMPLE 12

The same processes as those of Comparative Example 3 were carried out except that the porous ceramic member manufactured in the processes (1) of Example 16 was used to manufacture a honeycomb filter for purifying exhaust gases.

COMPARATIVE EXAMPLE 13

The same processes as those of Comparative Example 4 were carried out except that the porous ceramic member manufactured in the processes (1) of Example 16 was used to manufacture a honeycomb filter for purifying exhaust gases.

COMPARATIVE EXAMPLE 14

The same processes as those of Comparative Example 9 were carried out except that the porous ceramic member manufactured in the processes (1) of Example 16 was used to manufacture a honeycomb filter for purifying exhaust gases.

The thermal expansion coefficient $\alpha_F$ of each of the porous ceramic members thus manufactured and the thermal expansion coefficient $\alpha_L$ of the adhesive layer of each of the honeycomb filters according to Examples 16 to 18, Reference Examples 4 to 6 and Comparative Examples 10 to 14 were measured at respective temperatures of 300° C., 400° C., 600° C., 750° C. and 900° C. (Table 7) and based upon these values, the value of $(\alpha_L - \alpha_F)/\alpha_F$ was calculated (Table 8).

Moreover, each of the honeycomb filters according to Examples 16 to 18, Reference Examples 4 to 6 and Comparative Examples 10 to 14 was placed on a base having a hollow round-shape, and the honeycomb filter was supported at the portion of the porous ceramic members which is close to the circumference thereof so that, in this state, a force is applied onto one of the porous ceramic members near the center downward in a manner so as to push it out; thus, a push-out test for measuring a force to break the honeycomb filter was measured.

Furthermore, each of the honeycomb filters according to Examples 16 to 18, Reference Examples 4 to 6 and Comparative Examples 10 to 14 was placed in an exhaust passage of an engine, and this was subjected to repeated particulate collection tests of 100 times as well as those tests of 300 times, and then subjected to the same push-out test. Thus, based upon the results of measurements of the push-out tests, the degree of a decrease in the push-out strength before and after the particulate collection tests was calculated.

The results are shown in Table 9.

TABLE 7

|  |  | Thermal expansion rate (×10⁻⁶)1/K | | | | | Young's modulus |
|---|---|---|---|---|---|---|---|
|  |  | 300° C. | 400° C. | 600° C. | 750° C. | 900° C. | (GPa) |
| Porous ceramic member | | 5.7 | 5.3 | 3.5 | 3.3 | 3.9 | 27 |
| Adhesive layer | Example 16 | 5.8 | 5.4 | 3.6 | 3.5 | 4.0 | 14 |
|  | Example 17 | 10.3 | 9.7 | 6.3 | 5.7 | 6.9 | 9.1 |
|  | Example 18 | 11.2 | 10.0 | 7.2 | 6.8 | 7.7 | 7 |
|  | Reference Example 4 | 6.3 | 6.7 | 5.3 | 5.9 | 6.4 | 21 |
|  | Reference Example 5 | 7.5 | 7.4 | 6.3 | 5.9 | 6.4 | 19.6 |
|  | Reference Example 6 | 6.4 | 6.7 | 5.3 | 5.0 | 4.3 | 17.5 |
|  | Comparative Example 10 | 12.3 | 10.6 | 7.34 | 7.2 | 7.83 | 12 |
|  | Comparative Example 11 | 5.69 | 5.28 | 3.47 | 3.39 | 3.92 | 15 |
|  | Comparative Example 12 | 11.4 | 10.6 | 7.1 | 6.9 | 7.8 | 18 |
|  | Comparative Example 13 | 12.4 | 11.3 | 7.5 | 7.4 | 8.64 | 21.7 |
|  | Comparative Example 14 | 5.69 | 5.28 | 3.46 | 3.39 | 3.91 | 25.2 |

TABLE 8

|  | $(\alpha_I - \alpha_F)/\alpha_F$ | | | | | | Young's modulus ratio |
|---|---|---|---|---|---|---|---|
|  | 300° C. | 400° C. | 600° C. | 750° C. | 900° C. | Average | (%) |
| Example 16 | 0.02 | 0.02 | 0.03 | 0.06 | 0.03 | 0.03 | 51.9 |
| Example 17 | 0.81 | 0.83 | 0.80 | 0.73 | 0.77 | 0.79 | 33.7 |
| Example 18 | 0.96 | 0.89 | 1.06 | 1.06 | 0.97 | 0.99 | 25.9 |
| Reference Example 4 | 0.11 | 0.26 | 0.51 | 0.79 | 0.64 | 0.46 | 77.8 |
| Reference Example 5 | 0.32 | 0.40 | 0.80 | 0.79 | 0.64 | 0.59 | 72.6 |
| Reference Example 6 | 0.11 | 0.26 | 0.51 | 0.51 | 0.10 | 0.30 | 64.8 |
| Comparative Example 10 | 1.16 | 1.00 | 1.10 | 1.18 | 1.01 | 1.09 | 44.4 |
| Comparative Example 11 | −0.002 | −0.004 | −0.009 | 0.027 | 0.005 | 0.004 | 55.6 |
| Comparative Example 12 | 1.00 | 1.00 | 1.03 | 1.09 | 1.00 | 1.02 | 66.7 |
| Comparative Example 13 | 1.18 | 1.13 | 1.14 | 1.24 | 1.22 | 1.18 | 80.4 |
| Comparative Example 14 | −0.002 | −0.004 | −0.011 | 0.027 | 0.003 | 0.0026 | 93.3 |

TABLE 9

|  | Before collection test | After collection tests of 100 times | | After collection tests of 300 times | | |
|---|---|---|---|---|---|---|
|  | Push-out test (N) | Push-out test (N) | Relative strength <to that before collection tests> (%) | Push-out test (N) | Relative strength <to that before collection tests> (%) | Relative strength <to that after collection tests of 100 times> (%) |
| Example 16 | 15183 | 8820 | 58 | 8199 | 54 | 93 |
| Example 17 | 21224 | 12864 | 61 | 11248 | 53 | 87 |
| Example 18 | 19324 | 11430 | 59 | 9662 | 50 | 85 |
| Reference Example 4 | 25518 | 18010 | 71 | 11080 | 43 | 62 |

TABLE 9-continued

|  | Before collection | After collection tests of 100 times | | After collection tests of 300 times | | |
| --- | --- | --- | --- | --- | --- | --- |
|  | test Push-out test (N) | Push-out test (N) | Relative strength <to that before collection tests> (%) | Push-out test (N) | Relative strength <to that before collection tests> (%) | Relative strength <to that after collection tests of 100 times> (%) |
| Reference Example 5 | 21022 | 13397 | 64 | 9281 | 44 | 69 |
| Reference Example 6 | 18173 | 14300 | 79 | 9812 | 54 | 69 |
| Comparative Example 10 | 16758 | 7756 | 46 | 5865 | 35 | 76 |
| Comparative Example 11 | 18440 | 8053 | 44 | 5900 | 32 | 73 |
| Comparative Example 12 | 17423 | 8338 | 48 | 6098 | 35 | 73 |
| Comparative Example 13 | 16477 | 4828 | 29 | 3296 | 20 | 68 |
| Comparative Example 14 | 17481 | 7275 | 42 | 5244 | 30 | 72 |

As shown in Table 8, all the values $(\alpha_L-\alpha_F)/\alpha_F$ of the honeycomb filters according to Examples 16 to 18 are set within a range from 0.01 to 1.0, and all the Young's modulus ratio (Young's modulus of adhesive layer/Young's modulus of porous ceramic member×100) are 60% or less. Here, the values $(\alpha_L-\alpha_F)/\alpha_F$ of the honeycomb filter according to Example 18 obtained at 600° C. and 750° C. are 1.0 or more; however, the average value is 0.98, which is less than 1.0.

In contrast, all the values $(\alpha_L-\alpha_F)/\alpha_F$ of the honeycomb filters according to Reference Examples 4 to 6 are set within a range from 0.01 to 1.0; however, all the Young's modulus ratios exceed 60%.

All the values $(\alpha_L-\alpha_F)/\alpha_F$ of the honeycomb filters according to Comparative Examples 10, 12 and 13 are greater than 1.0, and all the values $(\alpha_L-\alpha_F)/\alpha_F$ of the honeycomb filters according to Comparative Examples 11 and 14 are smaller than 0.01. Moreover, all the Young's modulus ratios of the honeycomb filters according to Comparative Examples 10 and 11 are 60% or less, and all the Young's modulus ratios of the honeycomb filters according to Comparative Examples 12 to 14 exceed 60%.

As shown in Table 9, in the case of the honeycomb filters according to Examples 16 to 18 and Reference Examples 4 to 6 in which the values $(\alpha_L-\alpha_F)/\alpha_F$ are set within a range from 0.01 to 1.0, as the results of the push-out tests, all the relative strengths after collection tests of 100 times to those before the tests: (strength after collection tests of 100 times/strength before collection tests×100) are 58% or more, which is not so low in the strength decrease. However, in the case of the honeycomb filters according to Examples 10 to 15 in which the Young's modulus ratios are 60% or less, all the relative strengths after collection tests of 300 times to the strengths after the collection tests of 100 times: (strength after collection tests of 300 times/strength after collection tests of 100 times×100) are 85% or more, while in the case of the honeycomb filters according to Reference Examples 4 to 6 in which the Young's modulus ratios exceed 60%, the relative strengths after the collection tests of 300 times to the strengths after the collection tests of 100 times are set in a range from 62 to 69%, which is a low level.

With respect to the honeycomb filters according to Comparative Examples 10 to 14, all the push-out strengths before collection tests are almost the same as the push-out strengths of the honeycomb filters according to Examples 16 to 18 and Reference Examples 4 to 6; however, all the relative strengths after collection tests of 100 times to those before the collection tests are 48% or less, and all the relative strengths after collection tests of 300 times to those before the collection tests are 35% or less, which is great in the strength decrease.

INDUSTRIAL APPLICABILITY

The honeycomb filter for purifying exhaust gases of the present invention has the above-mentioned structure; therefore, even in the case where a local temperature change occurs in the honeycomb filter due to local burning and the like, the honeycomb filter can alleviate the resulting thermal stress, is less likely to generate cracks, and is excellent in strength and durability.

The invention claimed is:

1. A honeycomb filter for purifying exhaust gases, comprising:
   a ceramic block comprising a plurality of columnar porous ceramic members each having a plurality of partition walls and a plurality of through holes separated by the partition walls and extending in parallel with one another in a longitudinal direction of the columnar porous ceramic members, the through holes including ones plugged on an inlet side of the ceramic block and ones plugged on an outlet side of the ceramic block, the ceramic block having a circumferential surface extending in the longitudinal direction between the inlet side and the outlet side;
   an adhesive layer adhering and interposed between the columnar porous ceramic members; and
   a sealing layer sealing the circumferential surface of the ceramic block,
   wherein the adhesive layer and the columnar porous ceramic members satisfy a relationship, $0.01<|\alpha_L-\alpha_F|/\alpha_F<1.0$, where $\alpha_L$ is a thermal expansion coefficient of the adhesive layer and $\alpha_F$ is a thermal expansion coefficient of the columnar porous ceramic members.

2. A honeycomb filter for purifying exhaust gases, comprising:
   a ceramic block comprising a plurality of columnar porous ceramic members each having a plurality of partition walls and a plurality of through holes separated by the partition walls and extending in parallel with one another in a longitudinal direction of the columnar porous ceramic members, the through holes comprising ones plugged on an inlet side of the ceramic block and ones plugged on an outlet side of the ceramic block, the ceramic block having a circumferential surface extending in the longitudinal direction between the inlet side and the outlet side;

an adhesive layer adhering and interposed between the columnar porous ceramic members; and a sealing member sealing the circumferential surface of the ceramic block, wherein the adhesive layer has Young's modulus of 60% or less of Young's modulus of the porous ceramic members, and the adhesive layer and the columnar porous ceramic members satisfy a relationship, $0.01 < (\alpha_L - \alpha_F)/\alpha_F < 1.0$, where $\alpha_L$ is a thermal expansion coefficient of the adhesive layer and $\alpha_F$ is a thermal expansion coefficient of the columnar porous ceramic members.

3. The honeycomb filter for purifying exhaust gases according to claim 1, further comprising a catalyst which purifies at least one of CO, HC and $NO_x$ in the exhaust gases.

4. The honeycomb filter for purifying exhaust gases according to claim 2, further comprising a catalyst which purifies at least one of CO, HC and $NO_x$ in the exhaust gases.

5. The honeycomb filter for purifying exhaust gases according to claim 1, wherein the adhesive layer comprises an adhesive material and the adhesive material includes a foaming material in an amount sufficient such that the thermal expansion coefficient of the adhesive layer is adjusted to satisfy the relationship, $0.01 < |\alpha_L - \alpha_F|/\alpha_F < 1.0$.

6. The honeycomb filter for purifying exhaust gases according to claim 1, wherein the adhesive layer comprises an adhesive material and the adhesive material includes a thermoplastic resin in an amount sufficient such that the thermal expansion coefficient of the adhesive layer is adjusted to satisfy the relationship, $0.01 < |\alpha_L - \alpha_F|/\alpha_F < 1.0$.

7. The honeycomb filter for purifying exhaust gases according to claim 1, wherein the adhesive layer comprises an adhesive material and the adhesive material includes a thermosetting resin in an amount sufficient such that the thermal expansion coefficient of the adhesive layer is adjusted to satisfy the relationship, $0.01 < |\alpha_L - \alpha_F|/\alpha_F < 1.0$.

8. The honeycomb filter for purifying exhaust gases according to claim 1, wherein the adhesive layer comprises an adhesive material and the adhesive material includes a plurality of balloons comprising an inorganic substance in an amount sufficient such that the thermal expansion coefficient of the adhesive layer is adjusted to satisfy the relationship, $0.01 < |\alpha_L - \alpha_F|/\alpha_F < 1.0$.

9. The honeycomb filter for purifying exhaust gases according to claim 1, wherein the adhesive layer comprises an adhesive material and the adhesive material includes a plurality of balloons comprising an organic substance in an amount sufficient such that the thermal expansion coefficient of the adhesive layer is adjusted to satisfy the relationship, $0.01 < |\alpha_L - \alpha_F|/\alpha_F < 1.0$.

10. The honeycomb filter for purifying exhaust gases according to claim 2, wherein the adhesive layer comprises an adhesive material and the adhesive material includes a foaming material in an amount sufficient such that at least one of the thermal expansion coefficient and Young's modulus of the adhesive layer is adjusted to satisfy the relationship, $0.01 < (\alpha_L - \alpha_F)/\alpha_F < 1.0$, and 60% or less of Young's modulus of the porous ceramic members.

11. The honeycomb filter for purifying exhaust gases according to claim 2, wherein the adhesive layer comprises an adhesive material and the adhesive material includes a thermoplastic resin in an amount sufficient such that at least one of the thermal expansion coefficient and Young's modulus of the adhesive layer is adjusted to satisfy the relationship, $0.01 < (\alpha_L - \alpha_F)/\alpha_F < 1.0$, and 60% or less of Young's modulus of the porous ceramic members.

12. The honeycomb filter for purifying exhaust gases according to claim 2, wherein the adhesive layer comprises an adhesive material and the adhesive material includes a thermosetting resin in an amount sufficient such that at least one of the thermal expansion coefficient and Young's modulus of the adhesive layer is adjusted to satisfy the relationship, $0.01 < (\alpha_L - \alpha_F)/\alpha_F < 1.0$, and 60% or less of Young's modulus of the porous ceramic members.

13. The honeycomb filter for purifying exhaust gases according to claim 2, wherein the adhesive layer comprises an adhesive material and the adhesive material includes a plurality of balloons comprising an inorganic substance in an amount sufficient such that at least one of the thermal expansion coefficient and Young's modulus of the adhesive layer is adjusted to satisfy the relationship, $0.01 < (\alpha_L - \alpha_F)/\alpha_F < 1.0$, and 60% or less of Young's modulus of the porous ceramic members.

14. The honeycomb filter for purifying exhaust gases according to claim 2, wherein the adhesive layer comprises an adhesive material and the adhesive material includes a plurality of balloons comprising an organic substance in an amount sufficient such that at least one of the thermal expansion coefficient and Young's modulus of the adhesive layer is adjusted to satisfy the relationship, $0.01 < (\alpha_L - \alpha_F)/\alpha_F < 1.0$, and 60% or less of Young's modulus of the porous ceramic members.

* * * * *